United States Patent
Usui

(10) Patent No.: US 11,947,338 B1
(45) Date of Patent: Apr. 2, 2024

(54) METHODS AND APPARATUSES FOR DIMENSIONING AND MODIFYING A PART TO BE MANUFACTURED

(71) Applicant: PROTOLABS, INC., Maple Plain, MN (US)

(72) Inventor: Shuji Usui, Maple Plain, MN (US)

(*) Notice: Subject to any disclaimer, the term of this patent is extended or adjusted under 35 U.S.C. 154(b) by 0 days.

(21) Appl. No.: 18/208,161

(22) Filed: Jun. 9, 2023

(51) Int. Cl.
*G06F 119/18* (2020.01)
*G05B 19/418* (2006.01)

(52) U.S. Cl.
CPC ...... *G05B 19/4183* (2013.01); *G05B 19/41845* (2013.01); *G05B 2219/35179* (2013.01); *G05B 2219/35193* (2013.01); *G05B 2219/35223* (2013.01); *G06F 2119/18* (2020.01)

(58) Field of Classification Search
CPC .......... G05B 19/4183; G05B 19/41845; G05B 2219/35179; G05B 2219/35193; G05B 2219/35223; G06F 2119/18
See application file for complete search history.

(56) References Cited

U.S. PATENT DOCUMENTS

| | | | |
|---|---|---|---|
| 11,132,473 B2 | 9/2021 | Phinney | |
| 2008/0069428 A1* | 3/2008 | Schulkin | G01B 11/24 700/109 |
| 2015/0127131 A1* | 5/2015 | Herrman | G06Q 30/0283 700/98 |
| 2015/0127480 A1* | 5/2015 | Herrman | G06Q 30/0611 705/26.4 |
| 2019/0294754 A1* | 9/2019 | Roberts | G06F 30/00 |
| 2021/0004369 A1 | 1/2021 | Jones | |
| 2021/0088867 A1* | 3/2021 | Nagel | G01N 21/8851 |
| 2022/0214666 A1 | 7/2022 | King | |
| 2023/0004685 A1* | 1/2023 | Poulin | G06Q 50/04 |
| 2023/0222257 A1* | 7/2023 | Owa | G06F 30/12 703/7 |

FOREIGN PATENT DOCUMENTS

WO WO-2004114165 A1 * 12/2004 ............ G06T 19/00

OTHER PUBLICATIONS

Tenma, WO-2004114165-A1 English Translation, Dec. 2004 (Year: 2004).*

* cited by examiner

*Primary Examiner* — Kenneth M Lo
*Assistant Examiner* — Jonathan Michael Skrzycki
(74) *Attorney, Agent, or Firm* — Caldwell Intellectual Property Law

(57) ABSTRACT

Apparatuses and methods for dimensioning and modifying a part to be manufactured are provided. Part information for a part to be manufactured is received by a processor, where the part information includes a model and print of the part. Tolerance datum are extracted from the print and a manufacturability datum is determined as a function of the model and tolerance datum. Updated tolerance datum is generated and a manufacturability of the part is determined. A manufacturing quote and user feedback is provided.

20 Claims, 9 Drawing Sheets

METHODS AND APPARATUSES FOR DIMENSIONING AND MODIFYING A PART TO BE MANUFACTURED

FIELD OF THE INVENTION

The present invention generally relates to the field of computer-aided design and manufacturing analysis. In particular, the present invention is directed to methods and apparatuses for dimensioning and modifying a part to be manufactured.

BACKGROUND

Manufacturing facilities such as machine shops endeavor to provide thorough and fast service to their customers, and the computer age has allowed continually improved methods for customers to generate models of parts that they wish to have manufactured. However, customers frequently have varying skill levels and engineering knowledge and therefore are prone to make mistakes or inefficient design decisions when creating models of parts they wish to have manufactured. There is currently an unmet need for a solution to provide a customer or user with efficiently and quickly generated feedback about part models submitted to a manufacturing facility.

SUMMARY OF THE DISCLOSURE

In an aspect, an apparatus for dimensioning and modifying a part to be manufactured is provided. The apparatus comprises at least one processor and a memory communicatively connected to the processor. The memory contains instructions configuring the processor to receive part information for the part to be manufactured wherein the part information for the part to be manufactured includes a representative part model of the part to be manufactured and a print of the part to be manufactured, extract at least one tolerance datum from the print, determine at least one manufacturability datum as a function of the at least one tolerance datum and the representative part model of the part to be manufactured, create at least one updated tolerance datum as a function of the at least one manufacturability datum, construct an updated representative part model of the part to be manufactured as a function of the at least one updated tolerance datum, generate a manufacturing quote based on the at least one updated tolerance datum and the updated representative part model of the part to be manufactured, and transmit the at least one updated tolerance datum, the at least one manufacturability datum, the manufacturing quote, and/or the updated representative part model of the part to be manufactured to a user interface.

In another aspect, a method for dimensioning and modifying a part to be manufactured is provided. The method comprises the steps of receiving, by a processor, part information for the part to be manufactured, wherein the part information for the part to be manufactured includes a representative part model of the part to be manufactured and a print of the part to be manufactured. The method further comprises the steps of extracting, by the processor, at least one tolerance datum from the print, determining, by the processor, at least one manufacturability datum as a function of the at least one tolerance datum and the representative part model of the part to be manufactured, creating, by the processor, at least one updated tolerance datum as a function of the at least one manufacturability datum, constructing, by the processor, an updated representative part model of the part to be manufactured as a function of the at least one updated tolerance datum, generating, by the processor, a manufacturing quote based on the at least one updated tolerance datum and the updated representative part model of the part to be manufactured, and transmitting, by the processor, the at least one updated tolerance datum, the at least one manufacturability datum, the manufacturing quote, and/or the updated representative part model of the part to be manufactured to a user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for dimensioning and modifying a part to be manufactured. When a user or customer wishes to have a part manufactured, for instance at a machine shop, the user must submit designs, models, or drawings that completely define the part. Such drawings, often referred to as engineering drawings or "prints," list various perspectives showing numerical dimensions of the part to be created, typically three orthogonal perspectives. The dimensions define the shape and extent of each feature of the part such that the part is fully defined. While these dimensions are a single number, in practice the part will not conform with 100% precision to the specified dimension. These variations are due to a wide variety of reasons, including tool wear, measurement error, machine calibration error, operator error, or the mere fact that at a molecular level, there is no such thing as perfectly flat, straight, etc. All parts have some level of permissible variation from the specified dimensions. These permissible variations are known as "tolerances" and are typically specified by the user or customer generating the model of a part to be manufactured. However, some users do not have formal or extensive training in engineering or part design, and may select tolerances that are either not possible, or would add unnecessary time or cost to the manufacturing of the part. What is needed in the art are apparatuses and methods for quickly, efficiently, and automatedly providing corrections and suggestions to a user-submitted part model such that the tolerance values in the part model reflect the optimal balance between manufacturing time, manufacturing cost, machine capability, desired throughput, and other factors. Further, it would be highly beneficial to be able to provide a user with feedback regarding why a tolerance value was changed, how to ensure an optimal selection in the future, and what effect the change had on the part to be manufactured and related manufacturing parameters such as cost and time. The present invention provides such systems and methods.

Figure 1:
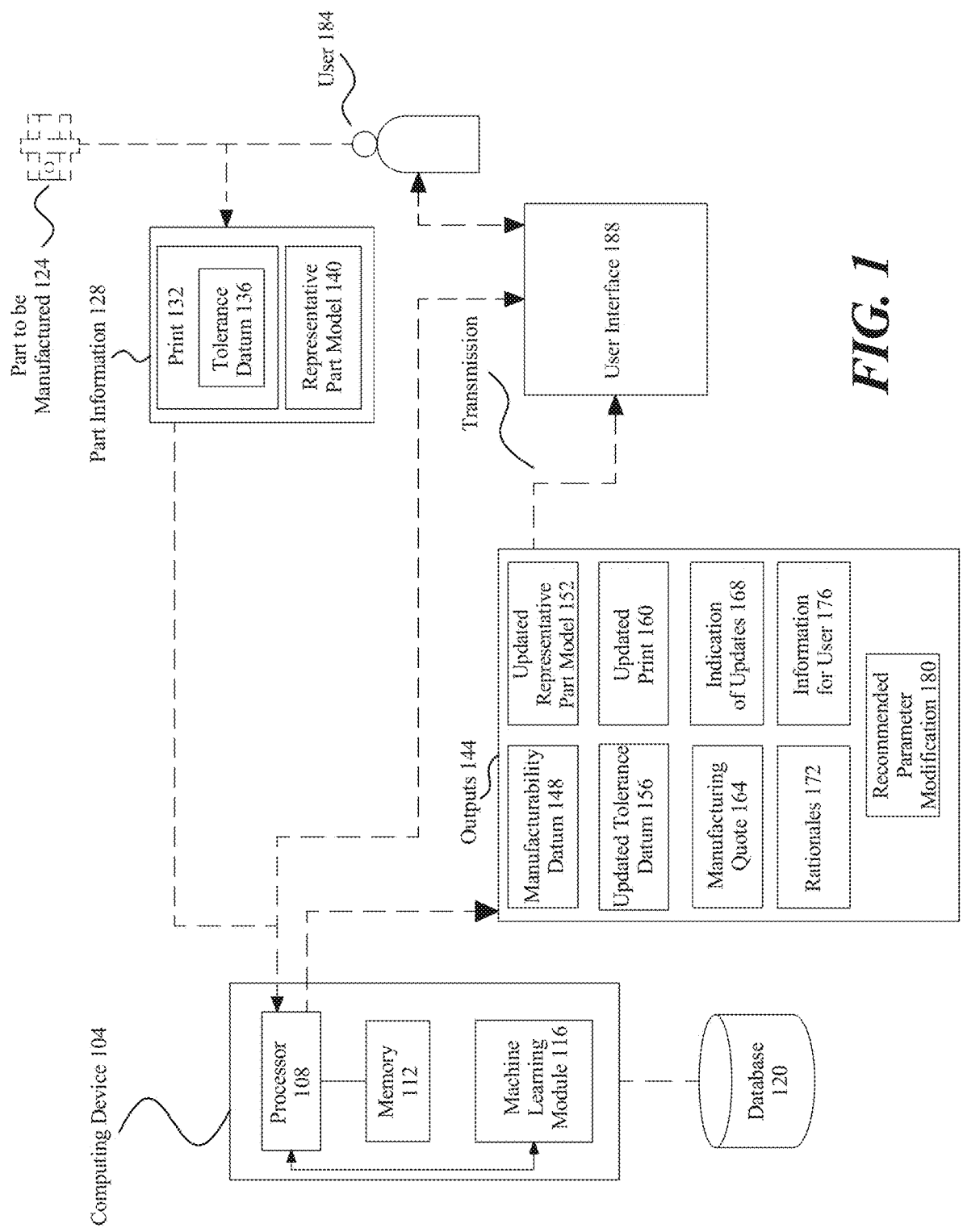
FIG. 1 is a block diagram of an apparatus for dimensioning and modifying a part to be manufactured according to an embodiment of the invention.

Referring now to FIG. 1, an exemplary embodiment of an apparatus 100 for dimensioning and modifying a part to be manufactured is illustrated. System includes a computing device 104. Computing device 104 may include any computing device as described in this disclosure, including without limitation a microcontroller, processor, microprocessor, digital signal processor (DSP) and/or system on a chip (SoC) and/or Graphics processing unit (GPU) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, processor 108 is configured to receive part information 128 from user 184. Part information 128 may be received from user interface 188 or from another suitable source. Part information 128 specifies parameters defining part to be manufactured 124 including dimensions and tolerances of part to be manufactured 124. Part information 128 includes a print 132 of the part to be manufactured 124 and a representative part model 140 of the part to be manufactured 124. "Part information," as used in this disclosure, is at least an element of data associated with a part to be manufactured. A "representative part model," as used in this disclosure, is a description, illustration, two-dimensional or three-dimensional model, and/or computer-aided design (CAD) model of a part to be manufactured, wherein manufacturing may include any manufacturing process as described in the entirety of this disclosure. A "part to be manufactured," as used in this disclosure, is a part intended to be manufactured or a part whose manufacturability is to be analyzed, wherein manufacturing may include any manufacturing process as described in the entirety of this disclosure. The part may include any item made of materials such as metals including, for example, aluminum, steel, titanium, metal alloys, brass, and the like; plastics, such as nylon, acrylic, ABS, Delrin, polycarbonate, and the like; foam, composites, wood, etc. In some embodiments, part information 128 may include any descriptive attributes of a part to be manufactured. "Descriptive attributes," as used in this disclosure, are any features, limitations, details, restrictions and/or specifications related to manufacturing of a part. Descriptive attributes may include, without limitation, any features, limitations, details, restrictions and/or specifications relating to a part geometry, materials, finishes, connections, hardware, special processes, dimensions, and the like. Descriptive attributes may include a tolerance of the part to be manufactured. Descriptive attributes may further include, without limitation, any features, limitations, details, restrictions, and/or specifications relating to a total request for manufacture, such as a request for pricing, estimated time for completion and the like. In a nonlimiting example, descriptive attributes may include a desired material for manufacturing, using metal, such as aluminum, steel alloy, brass, and the like. In some embodiments, part information 128 may be received by user input on a graphical user interface (GUI) of a computing device communicatively connected to processor 108. In an embodiment, part information 128 may be shown to a user as a list, wherein the user may select at least a descriptive attribute out of the list of descriptive attributes. In a nonlimiting example, a user may be presented with a plurality of descriptive attributes such as material of part to be manufactured, dimensions, tolerance levels, such as when a part is configured to be connected to an assembly, where user may select the desired options to be sent to processor 108. Persons skilled in the art, upon reviewing the entirety of this disclosure, will be aware of various descriptive attributes which may be suitable for part data consistent with this disclosure.

Continuing to refer to FIG. 1, print 132 includes tolerance datum 136 indicating manufacturing tolerances required for dimensions defining the part. "Tolerance datum" as used herein is at least an element of data related to a tolerance value or specification. "Tolerance," as used herein, is defined as the permissible limit or limits of variation between a desired or design dimension that defines a feature of a part and the actual value or range of values of the dimension of the feature once the part has been manufactured. More generally, "datum," as used herein, is defined as at least an element of information or data. Datum may include a plurality of data or elements of information. In an exemplary embodiment, part information 128 may include one or more of a three-dimensional computer-aided design (CAD) model of the part, a two-dimensional engineering drawing of the part, a bill of materials, a material specification for the part, and other information relating to part to be manufactured 124. As used in this disclosure, "two-dimensional" means having, appearing to have, or displaying two out of the three dimensions of length, width, and height. As used in this disclosure, "three-dimensional" means having, appearing to have, or displaying all three out of the three dimensions of length, width, and height. As used herein, a "print" is defined as any two-dimensional depiction of part to be manufactured 124. Such two-dimensional print 132 may include any data describing the part to be manufactured 124 such as dimensions and tolerances. Tolerance data includes at least tolerance datum 136. Tolerance datum 136 may include any data describing and/or identifying a geometric tolerance of the part to be manufactured. The geometric tolerance may include a form tolerance, an orientation tolerance, location tolerance, a run-out tolerance, and the like. The tolerance datum 136 may/be included in the print 132 of the part to be manufactured 124 as symbols, text, embedded information, and the like. Extracting the tolerance datum 136 may be performed utilizing a machine-learning process. Print 132 may include semantic datum of part to be manufactured 124. Print 132 may include geometric dimensioning and tolerancing (GD&T) information, which may be provided in one or more software files such as DXF files, DWG files, PDF files, and/or the like. A semantic datum may be implemented without limitation as described in U.S. patent application Ser. No. 17/698,119 filed on Mar. 18, 2022 and entitled "APPARATUSES AND METHODS FOR SUPERIMPOSITION OF A CROSS-SECTIONAL DRAWING OVER A THREE-DIMENSIONAL MODEL," the entirety of which is incorporated herein by reference.

Continuing to refer to FIG. 1, part information 128 includes representative part model 140. Representative part model 140 may further include a plurality of sides. Representative part model 140 may further include any data describing and/or relating to a representative part model of a part to be manufactured. A CAD model in accordance with this disclosure may be created using CAD software. For example and without limitation, CAD software may include SOLIDWORKS® software and/or CATIA software (available from Dassault Systèmes SolidWorks Corp, Waltham, Massachusetts), AUTOCAD® software and/or Fusion software (available from Autodesk, Inc., San Rafael, California), PTC Creo software (available from PTC, Inc., Boston, Massachusetts), Siemens NX software (available from Siemens PLM Software, Plano, Texas) and MICROSTATION® software (available from Bentley Systems, Inc., Exton, Pennsylvania), and the like. The representative part model may include any modeling type, such as, without limitation, a wireframe, solid model and/or any combination thereof. The representative part model may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and/or the like. The representative part model further includes information about the geometry and/or other defining properties of the mechanical part's structure. The representative part model may include a polygon mesh, such as a collection of vertices, edges, and faces, that define the shape of representative part model 140. For example and without limitation, the faces of the polygon mesh may include triangles, such as a triangle mesh, quadrilaterals, or other simple convex polygons.

Continuing to refer to FIG. 1, representative part model 140 may include a plurality of sides. Each side of plurality of sides, as used in this disclosure, may include a view of representative part model 140 from a plane orthogonal to an axis passing through an origin of representative part model 140. As a non-limiting example, the axis may be part of a three-axis coordinate system, such as the x-axis, y-axis, and z-axis; or abscissa, ordinate, and applicate. The axis may include, as a further non-limiting example, any axis as a function of the origin. Persons skilled in the art, upon reviewing the entirety of this disclosure, will be aware of axes which may be suitable for use with each side of the plurality of sides consistently with this disclosure. The origin of the representative part model, as described herein, is a fixed point of reference for the representative part model 140. For example and without limitation, the origin may include the center of mass, the geometric center, the center of bounding box, the center of a feature of the part, wherein a feature may be a hole, a well, a groove, a pocket, a channel, extruded volume, and the like. As a further example and without limitation, the origin may include any position of the representative part model. In some embodiments, the representative part model 140 may include a physical example of the part to manufactured.

Continuing to refer to FIG. 1, representative part model 140 may further include semantic information of the part to be manufactured. "Semantic information," as described in this disclosure, is data concerning and/or describing product and manufacturing information (PMI), model-based definition (MBD) information, functional dimensioning and tolerancing (FDT) information, and product life cycle management (PLM). PMI, as used in this disclosure, is data describing non-geometric attributes of a model of a part to be manufactured, such as the representative part model of representative part model 140, necessary for manufacturing the part, components of the part, and associated assemblies. For example, and without limitation, PMI may include geometric dimensions and tolerances (GD&T), 3D annotation and dimensions, surface finish, material specifications, and the like. In some embodiments, PMI may include details about the machinability of the part to be manufactured. PMI may include textual data, such as alphanumeric, punctuation, typographical symbols, character, string data, and/or any textual data as described in the entirety of this disclosure. PLM, as used in this disclosure, is any data concerning and/or describing management of the lifecycle of the part from inception, through engineering design and manufacture, to service and disposal of the manufactured part. PLM may include textual data, such as alphanumeric, punctuation, typographical symbols, character, string data, and/or any textual data as described in the entirety of this disclosure. In an embodiment, semantic information included in representative part model 140 may be used in processes for generating a manufacturing quote for a part to be manufactured.

Continuing to refer to FIG. 1, print 132 includes at least one tolerance datum 136. Processor 108 is configured to extract the at least one tolerance datum 136 from the print 132. Tolerances may be described in terms of fit such as clearance fit, an interference fit, driving fit, forced fit, similar fit, fixed fit, loose running fit, free running fit, close running fit, sliding fit, location fit, or any suitable description of a fit. As is known in the art, design specifications such as CAD models include tolerances because it is not possible to manufacture a real object such that the object has the perfect dimensions specified in such a CAD model. For example, imperfections such as dulling or chipping of cutting tools, slight variations in tool sizing, measurement or calibration errors, operator error, and the like mean that actual dimensions of the manufactured part will always vary to some degree from the corresponding dimensions specified in the design specifications. If the variations are small enough, the part can be used as designed with no or negligible impact on the function of the part. The maximum allowable variation for a dimension is specified by a corresponding tolerance. Variations in tolerance values may have associated manufacturing tradeoffs. For example, a feature manufactured using an end mill may have a standard tolerance of ±0.2 mm for a dimension of 10 mm. It may be possible for a manufacturing facility to machine the feature using an end mill with a tolerance as low as ±0.01 mm, however this might require additional machining and/or setup time, a more expensive end mill, additional machinist labor, or similar increase in work that may have a corresponding undesirable effect such as increased cost, longer lead time, lower throughput, or higher reject rate. Further, different manufacturing techniques will have different possible tolerances, which can result in required tradeoffs such as those outlined above. For example, a manufacturing facility may be able to machine a feature with a tightest possible tolerance of ±0.01 mm using a mill such as an end mill but may be able to machine the same feature with a tightest possible tolerance of ±0.003 mm using a wire electrical discharge machining (EDM) tool. Using these different methods will typically also involve tradeoffs such as differences in features that are possible to make, required machining time, manufacturing cost, reject rate and the like. A purpose of the present invention is to automatically provide a user with feedback on a submitted part design regarding selected tolerances and manufacturing methods, including potentially educating the user on what rationales are typically considered in the selection of tolerances or manufacturing methods.

Continuing to refer to FIG. 1, tolerance datum 136 may include information related to one or more physical characteristics, graphic elements, attributes, and/or properties of part for manufacture 124, which control the appearance and/or behavior of part for manufacture 124. For example, and without limitation, semantic data may include geometric dimensions and corresponding geometric tolerances, three-dimensional annotations and dimensions, surface roughness, surface textures, such as surface roughness or surface finish, material specifications, PMI, PLM, and the like. As used in this disclosure, a "geometric tolerance" is a quantified limit of allowable error of one or more physical attributes of a part for manufacture. Tolerance datum 136 may include a form tolerance such as straightness, flatness, circularity, and/or cylindricity; a profile tolerance such as profile of a line and/or profile of a surface; an orientation tolerance such as angularity, perpendicularity, and/or parallelism; location tolerance such as position, concentricity and/or symmetry; a runout tolerance such as circular runout and/or total runout; and the like. Tolerance datum 136 may be included in print 132 of part for manufacture 124 as symbols, annotations, numerical values, text, embedded information, and/or the like. As used in this disclosure, "text" includes letters, numbers, and/or symbols. Print 132 may include an image representing part for manufacture 124 or a component of part for manufacture 124, a number representing a numerical tolerance of the component, and/or an indicator that identifies the numerical tolerance is associated with the component. Print 132 may also indicate a unit of measurement and/or a scale, which may be included in tolerance datum 136 or on which tolerance datum 136 may be based. For example, print 132 may state that the dimensions are in inches, list the scale as "2:1", include a circle representing an exterior cylindrical surface of part for manufacture 124, and have an arrow pointing from "R0.5000±0.0003" to the circle. Processor 108 may be configured to recognize "±" as a symbol representing a tolerance for the preceding number in the amount of the succeeding number. Processor 108 may be configured to recognize "R" as a symbol identifying the tolerance being associated with a radius of the circle. Processor 108 may also be configured to identify the arrow and that it is pointing from the numbers to the circle and determined that the tolerance is for the circle, specifically the radius of the circle. Processor 108 may be configured to identify the unit of measurement stated in print 132 and determine that the radius tolerance for the circle is ±0.0003 inches. Processor 108 may also be configured to identify measurement scale and adjust numbers, including tolerance datum 136, accordingly. Processor 108 may be configured to determine scale by comparing an annotation of measurement to an actual length in print 132. In some embodiments, processor 108 may recognize encoding in a file of print 132 as representing tolerance datum 136 and may extract tolerance datum 136 from the file. Print 132 may include semantic information of part for manufacture 124 such as geometric dimensioning and tolerancing (GD&T) information, which may be provided in one or more software files such as DXF files, DWG files, PDF files, and/or the like.

Continuing to refer to FIG. 1, manufacturing processes considered by apparatus 100 may include a subtractive manufacturing process, which produces the product by removing material from a workpiece; the removal of material may be accomplished using abrasives, cutting tools or endmills, laser cutting water jet cutting or ablation, removal using heat, or any other method that removes material from the workpiece. Each subtractive manufacturing process used may be any suitable process, such as, but not limited to, rotary-tool milling, electronic discharge machining, polishing, ablation, etching, erosion, cutting, and cleaving, among others. If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In some embodiments, the milling equipment used for removing material may be of the computerized numerical control (CNC) type that is automated and operates by precisely programmed commands that control movement of one or more parts of the equipment to effect the material removal. CNC mills may operate in several axes as is known in the art; for example, lathe, a 3-axis, 4-axis, 5-axis, or 6-axis CNC mill. CNC machines, their operation, programming, and relation to CAM tools and CAD tools are well known and need not be described in detail herein for those skilled in the art to understand the scope of the present invention and how to practice it in any of its widely varying forms.

Continuing to refer to FIG. 1, manufacturing processes considered by apparatus 100 may include using spark-erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using water-jet or other fluid-jet cutting techniques. Fundamentally, any process for removal of material may be employed for subtractive manufacturing.

Continuing to refer to FIG. 1, manufacturing processes considered by apparatus 100 may include lathes, saws, water jets, presses such as drill presses, grinders, and other equipment.

Continuing to refer to FIG. 1, manufacturing processes considered by apparatus 100 may include an additive manufacturing process, in which material is deposited on the workpiece. In some embodiments, an additive manufacturing process is a process in which material is added incrementally to a body of material in a series of two or more successive steps. The material may be added in the form of a stack of incremental layers; each layer may represent a cross-section of the object to be formed upon completion of the additive manufacturing process. Each cross-section may, as a non-limiting example be modeled on a computing device as a cross-section of graphical representation of the object to be formed; for instance, a computer aided design (CAD) tool may be used to receive or generate a three-dimensional model of the object to be formed, and a computerized process may derive from that model a series of cross-sectional layers that, when deposited during the additive manufacturing process, together will form the object. The steps performed by an additive manufacturing system to deposit each layer may be guided by a computer aided manufacturing (CAM) tool. In other embodiments, a series of layers are deposited in a substantially radial form, for instance by adding a succession of coatings to the workpiece. Similarly, the material may be added in volumetric increments other than layers, such as by depositing physical voxels in rectilinear or other forms. Additive manufacturing, as used in this disclosure, may specifically include manufacturing done at the atomic and nano level. Additive manufacturing also includes bodies of material that are a hybrid of other types of manufacturing processes, e.g. forging and additive manufacturing as described above. As an example, a forged body of material may have welded material deposited upon it which then comprises an additive manufactured body of material.

Deposition of material in additive manufacturing process may be accomplished by any suitable means. Deposition may be accomplished using stereolithography, in which successive layers of polymer material are deposited and then caused to bind with previous layers using a curing process such as curing using ultraviolet light. Additive manufacturing processes may include "three-dimensional printing" processes that deposit successive layers of power and binder; the powder may include polymer or ceramic powder, and the binder may cause the powder to adhere, fuse, or otherwise join into a layer of material making up the body of material or product. Additive manufacturing may include metal three-dimensional printing techniques such as laser sintering including direct metal laser sintering (DMLS) or laser powder-bed fusion. Likewise, additive manufacturing may be accomplished by immersion in a solution that deposits layers of material on the body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing or combine two or more methods. Companies producing additive manufacturing equipment include 3D Systems, Stratasys, Formlabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Additive manufacturing may include deposition of initial layers on a substrate. Substrate may include, without limitation, a support surface of an additive manufacturing device, or a removable item placed thereon. Substrate may include a base plate, which may be constructed of any suitable material; in some embodiments, where metal additive manufacturing is used, base plate may be constructed of metal, such as titanium. Base plate may be removable. One or more support features may also be used to support additively manufactured body of material during additive manufacture; for instance and without limitation, where a downward-facing surface of additively manufactured body of material is constructed having less than a threshold angle of steepness, support structures may be necessary to support the downward-facing surface; threshold angle may be, for instance 45 degrees. Support structures may be additively constructed and may be supported on support surface and/or on upward-facing surfaces of additively manufactured body of material. Support structures may have any suitable form, including struts, buttresses, mesh, honeycomb or the like; persons skilled in the art, upon reviewing the entirety of this disclosure, will be aware of various forms that support structures may take consistently with the described methods and apparatuses.

Continuing to refer to FIG. 1, the processor 108 is further configured to determine at least one manufacturability datum 148 as a function of at least one tolerance datum 136 extracted from the print 132 and the representative part model 140 of the part to be manufactured 124. As used in this disclosure, a "manufacturability datum" is a value, parameter, description, and/or indicator that provides information about the degree to which a product can be effectively manufactured given its design, cost, distribution requirements, and the like. A manufacturability datum 148 may be generated for each feature of the part to be manufactured 124 or part to be manufactured 124 as a whole. Examples of a feature may include surfaces, edges, opening, shapes, sizes, and the like. In some embodiments, manufacturability datum 148 may include a comparison of the manufacturer's capabilities to the part information 128. As used in the current disclosure, the "manufacturer's capabilities" are the manufacturer's ability to machine a given feature. A manufacturer's capabilities may be determined as a function of the equipment, staff, and experience that is available to the manufacturer. In a non-limiting example, if the manufacturer's capabilities only allow for part to be manufactured 124 with tolerance for a given feature above ±0.025 mm. A manufacturability datum 148 may compare a part to be manufactured 124 has features that require a tolerance of ±0.01 mm to the above-mentioned manufacturer's capabilities. As a result, the manufacturability datum 148 may identify the feature as an unmanufacturable feature. Manufacturability datum 148 may indicate a relative ease with which a part may be manufactured. Manufacturability datum 148 may indicate if the part to be manufactured is possible to manufacture. In an embodiment, manufacturability datum 148 may be an evaluation of whether the representative part model 140 can be consistently manufactured to a given standard. In a non-limiting example, a manufacturability datum 148 may comprise a Boolean value, a score, or a single datum value for the part to be manufactured. Additionally, manufacturability datum 148 may comprise a list of geometric features depicted in the model, where each geometric feature in the list receives an individual manufacturability datum 148. Manufacturability datum 148 may comprise a vector or table of values linked to and/or corresponding to features of the part to be manufactured 124. In an exemplary embodiment, manufacturability datum 148 may be created based on a consideration of one or more of the amount of force it would take to machine the parts without causing deflection of the part in the fixturing system, available feed rates, available milling spindle speeds, realistic material removal rates, potential occurrences of work hardening associated with various machining methods, machinability of the part, chemical, electrical, thermal or other material interactions, part dimensions such as final dimensions or feedstock dimensions, or other considerations. Both deflection of tool and part may deteriorate accuracy of the part and result in a failure to meet specified dimensions or tolerances. "Machinability" as used herein is defined as the ease with which material can be removed from a part in order to create that part. A person skilled in the art would understand that in general, parts with tighter tolerances will be less machinable than parts with looser tolerances.

Continuing to refer to FIG. 1, manufacturability datum 148 may be based on, correspond to, comprise, or be represented as a metric, value, number, relative descriptor, parameter, scale, weight, range of values, ranking, semantic description, relative percentage compared to the manufacturing of a similar part or parts, percentile of one or more parameters related to the manufacturing of the part to be manufactured 124 or other parts, or any other suitable metric indicating requirements for manufacturing a part. Manufacturability datum 148 may be a function of machining time, required labor, material type, part geometry, available machining methods, available tools, cost constraints, order of feature creation, and the like. For instance, manufacturability datum 148 may comprise a list of percentiles of parameters for a given part to be manufactured 124, related part information 128, and tolerance datum 136 as compared to other parts. In some embodiments, information about other parts may be stored in database 120. In some embodiments, information about other parts may be utilized comparatively to generate manufacturability datum 148. In an embodiment, manufacturability datum 148 may comprise percentiles of various parameters as compared to a database of corresponding data, such as material cost, manufacturing time, lead time, labor time, labor cost, machinability, geometric complexity, number of machining steps, and the like. In an embodiment, manufacturability datum 148 may indicate that manufacturing of a given part is not possible and outputs 144 may be generated accordingly.

Continuing to refer to FIG. 1, in an exemplary embodiment, the processor 108 may determine that, given part information 128, the particular parameters of labor time, labor cost, and geometric complexity each fall into a respective percentile as compared to similar parts or all parts of which there is data. Processor 108 may select parts from database 120 with which to compare part to be manufactured 124 based on a number of criteria. For example, processor 108 may select parts made of the same or similar materials, parts occupying a similar total volume (e.g. ±20% of the part to be manufactured 124), parts with the same or similar largest and smallest dimensions (e.g. ±20% of the part to be manufactured 124), parts with an overall cost similar to an estimated cost of the part to be manufactured 124 (e.g. ±20% of the part to be manufactured 124), parts made to perform the same or similar function as part to be manufactured 124, parts made for the same entity or user as part to be manufactured 124, parts created using a particular machining method or group of machining methods, parts with the same general shape, parts with at least one same or similar tolerance datum, parts with at least one same or similar feature (such as fillets, protrusions, holes, internal or external geometry, etc.) or any suitable selection criteria. The foregoing data may be part of a training data set correlating any one or more of the above parameters with any other one or more of the above parameters. Processor 108 may further select a desired range of percentiles to compare prior to selecting parts. For example, processor 108 may determine that the most relevant data should come from parts between the $20^{th}$ and $80^{th}$ percentiles of a given category. Processor 108 may then retrieve part information corresponding to any one or more of the above parameters (or any other parameter listed in this disclosure that one of ordinary skill in the art would be relevant for comparison purposes) within the determined percentile range. Processor 108 and/or machine learning module 116 may classify data using a classifier, for instance an algorithm trained using human labeling of input data as "ground truth" data. Processor 108 and/or machine learning module 116 may classify data using past quality assurance measurement data for the particular features. The comparative part data may then be selected based on the output of the classifier. Processor 108 may retrieve, store, and update data associating comparative part information with percentiles or other metrics using database 120, as part of part information 128, through user interface 188, or another source as apparent from this disclosure. Processor 108 may utilize or receive information from machine learning module 116, including using machine learning algorithms described in accordance with this disclosure, to determine any of the above parameters or percentiles. For instance, training data correlating any one or more of the above parameters with any other one or more of the above parameters may be used to train a machine learning model in accordance with this disclosure. Any of the above parameters may then be input to the trained machine learning model and a corresponding percentile of the part to be manufactured 124 for one or more selected categories may be generated.

Continuing to refer to FIG. 1, in an exemplary embodiment, the manufacturability datum 148 may indicate that the part to be manufactured 124 is in the $20^{th}$ percentile of lead time (meaning 20% of compared parts have lower lead time and 80% of compared parts have higher lead time) but the $80^{th}$ percentile of manufacturing time and cost (meaning 80% of compared parts have lower manufacturing time and cost, and 20% of compared parts have a higher manufacturing time and cost). This may result in a manufacturability datum 148 indicating that the manufacturability of the part is unacceptably low. Manufacturability datum 148 may itself be represented as a percentile when compared to manufacturability datum of other parts. For instance, manufacturability datum 148 may be calculated by taking an unweighted average of percentiles for chosen parameters and inverting some percentiles according to a higher manufacturability being more positive where necessary.

The determined manufacturability datum 148 may include a calculation of direct and/or market milling minutes which may predict what a typical competitor would take in terms of machining time and cost. In an embodiment, market milling minutes may be calculated as a function of at least a material removal rate and at least an area removal rate for the at least a mechanical part. In an embodiment, material removal rate (MRR) may be calculated as:

MRR=<Depth of Cut>·<Width of Cut>·<Feed Rate>

An area removal rate (ARR) may be calculated as:

ARR=<Depth of Cut>·<Feed Rate>

ARR=<Width of Cut>·<Feed Rate>

ARR=<Stepover>·<Feed Rate>

Calculating market milling minutes (Ts) may include:

$$T^{MKT} = \frac{V_1}{MRR_1} + \frac{V_2}{MRR_2} + \frac{V_3}{MRR_3} + \ldots \frac{V_n}{MRR_n} + \frac{S_1}{ARR_1} + \frac{S_2}{ARR_2} + \frac{S_3}{ARR_3} + \ldots \frac{S_n}{ARR_n}$$

Where $V_{1 \ldots n}$ are volumes removed in a given section or milling step and Si are surface areas of a cutting implement for a given section.

Continuing to refer to FIG. 1, the processor 108 is further configured to create at least one updated tolerance datum 156 as a function of the at least one manufacturability datum 148. For example, the processor 108 may determine that tolerance datum 136 reduces the manufacturability datum 148 of the part to be manufactured 124 below a threshold. In an embodiment, the processor 108 may provide multiple quotes with tolerance options. Processor 108 may reference industrial standards such as ASTM F1498-08 Standard Specification for Taper Pipe Thread and modify the tolerance datum 136 according to the standard. For instance, Processor 108 may reference fit standards including bearing fits, manufacturing fits, shaft fits, and housing fits and revise the tolerance datum 136 based on the application of the part. Processor 108 may reference the mechanical role in the assembly and application of the mechanical device and revise the tolerance to accomplish the mechanical functionality. In an embodiment, the processor 108 may determine a tolerance or set of tolerance data based on the information specified in the part information and recalculate the manufacturability datum 148 using one or more of these tolerances. In an alternative embodiment, the processor 108 may iteratively choose tolerance values and recalculate manufacturability datum 148 with those tolerance values until an acceptable or threshold manufacturability datum 148 is reached. The processor 108 may then select one or more values for tolerance datum 136 to accomplish an intended mechanical functionality as the updated tolerance datum 156.

Continuing to refer to FIG. 1, updated tolerance datum 156 may include any data describing and/or identifying a geometric tolerance of the part to be manufactured. The geometric tolerance may include a form tolerance, an orientation tolerance, location tolerance, a run-out tolerance, and the like. The updated tolerance datum 156 may/be included in the updated print 160 of the part to be manufactured 124 as symbols, text, embedded information, and the like. Extracting the updated tolerance datum 156 may be performed utilizing a machine-learning process. Updated print 160 may include semantic datum of part to be manufactured 124. Updated print 160 may include geometric dimensioning and tolerancing (GD&T) information, which may be provided in one or more software files such as DXF files, DWG files, PDF files, and/or the like. Updated tolerances may be described in terms of fit such as clearance fit, an interference fit, driving fit, forced fit, similar fit, fixed fit, loose running fit, free running fit, close running fit, sliding fit, location fit, or any suitable description of a fit. In some embodiments, a tolerance datum may be updated by changing a tolerance from a first type of fit to a second type of fit.

Continuing to refer to FIG. 1, updated tolerance datum 156 may be generated by one or more machine learning algorithms. Processor 108 may identify changes to tolerance datum 136 that may improve manufacturability using machine learning. For instance, processor 108 and/or machine learning module 116 may access a training data set correlating tolerance data, part cost, manufacturing time, labor, throughput, lead time, part geometry, feature, feature size, material or materials, set-up time, required tools or types of machines, and/or any relevant metric relating to manufacturability. Inputs to the to the machine learning model may include training data, semantic datum, manufacturability datum 148, manufacturability assessments, workpiece material considerations, the time and cost to manufacture a part, the tool set, the type of equipment that is required to manufacture a part. Outputs from the machine learning model may be updated tolerance datum 156 sufficient to accomplish mechanical functionality indicated by the part information 128 or changes to tolerance datum 136 that maintain the functionality for part 124. The training data set is a plurality of data entries containing a plurality of inputs that are correlated to a plurality of outputs for training a processor by a machine-learning process to make corrections to improve manufacturability for a part as described with reference to FIGS. 4-6 below. Training data may contain information about workpiece materials including material type, microstructure, grain size, heat treatment, chemical composition, fabrication, hardness, yield strength, and/or tensile strength. Training data may include tolerances, geometric features for the part to be manufactured, time, cost, reject rate, tools required to machine the part, set-up, load time and quality assurance measurement data such as CMM (Coordinate-measuring machine) measurement, for the part to be manufactured, and/or manufacturability. In other embodiments, training data may include corrections from previous machine learning models. Training data may include any past corrections of the part stored in database 120 or a user input. For example, processor 108, machine learning module 116, or another device may train a machine learning model in accordance with this disclosure on training data correlating one or more of the above parameters with one or more tolerance parameters. Processor 108 and/or machine learning module 116 may instantiate a machine learning model or algorithm trained by another device. For example, training data may correlate finish types, material, manufacturing method, and labor to overall manufacturing cost. Training data may be produced in a supervised manner, e.g. a person or persons examine the correlations indicated by training data and confirm the data represents accurate and factual correlations. Training data may be produced in an unsupervised manner, e.g. correlations between parameters may be established within the training data based on a known method and used in a machine learning model or algorithm without human supervision. Processor 108 and/or machine learning module 116 may store, retrieve, exchange, and update information corresponding to training data, inputs, and/or outputs listed above on database 120 or any other suitable data storage location. In an embodiment, a suitable machine learning model or algorithm trained, performed, and/or instantiated with machine learning processes described above may include a supervised or unsupervised machine learning process; a regression model; a linear discriminant analysis; a quadratic discriminant model; a gradient descent model such as stochastic gradient descent; naïve Bayes model; decision tree model; neural network including convolutional neural network model; or models listed with reference to FIG. 4.

Continuing to refer to FIG. 1, the processor 108 is further configured to construct an updated representative part model 152 of the part to be manufactured 124 as a function of the at least one updated tolerance datum 156. For example, the processor 108 may change tolerance datum 136 in print 132 and representative part model 140 to updated tolerance datum 156 reflecting the sufficient tolerances determined by processor 108. The updated tolerance datum 156 may form the basis for updated print 160 and updated representative part model 152. In an embodiment, processor 108 may construct an updated print 160 and updated representative part model 152 of the part to be manufactured 124 using the same software used to create print 132 and representative part model 140. In an embodiment, processor 108 may directly edit or edit a copy of the file containing print 132. In an embodiment, processor 108 may directly edit or edit a copy of the file containing representative part model 140. In an embodiment, processor 108 may create updated representative part model 152 and/or updated print 160 by directly editing part information 128 or may create updated representative part model 152 and/or updated print 160 by editing a copy of part information 128. In an embodiment, processor 108 may create a file containing a different representation of print 132 as updated print 160. For example, if the only tolerance datum 136 that needed to be updated was in a single plane (for instance only in the front plane of a part represented by front, top, and side planes) of a three dimensional representative part model 140, processor 108 may simply create updated print 160 and/or updated representative part model 152 showing the updated plane rather than every plane in representative part model 140. In an embodiment, processor 108 automatically generates an updated representative part model 152 based on a determination that finished part quality could be improved. For example, if a user 184 forgets to include fillets on corners, the part 124 may have sharp corners at the conclusion of manufacturing that may cut a person's hand and increase manufacturing cost for certain features such as pockets. Processor 108 may determine that the corner features should be filleted and provide a user 184 with outputs 144 indicating the changes to the updated representative part model 152 including a rationale 172 and/or recommended parameter modification 180. In an additional or alternative example, a user 184 may specify a hole or other feature that cannot be reached by a tool, and may provide a recommended parameter modification 180 eliminating features that cannot be manufactured.

Continuing to refer to FIG. 1, updated representative part model 152 may be generated by one or more machine learning algorithms. Processor 108 may identify changes to tolerance datum 136 that may improve manufacturability using machine learning, which may then be applied to the updated part model 152. For instance, processor 108 and/or machine learning module 116 may access a training data set correlating tolerance data, part cost, manufacturing time, labor, throughput, lead time, part geometry, feature, feature size, material or materials, set-up time, required tools or types of machines, and/or any relevant metric relating to manufacturability. Inputs to the machine learning model may include semantic datum, manufacturability datum 148, manufacturability, workpiece material considerations, the time and cost to manufacture a part, the tool set, the type of equipment that is required to manufacture a part. The output from the machine learning model may be corresponding optimized tolerances or optimal changes to tolerances for the part. The training data set is a plurality of data entries containing a plurality of inputs that are correlated to a plurality of outputs for training a processor by a machine-learning process to make corrections to improve manufacturability for a part as described with reference to FIGS. 4-6 below.

Training data may contain information about workpiece materials including material type, microstructure, grain size, heat treatment, chemical composition, fabrication, hardness, yield strength, and/or tensile strength. Training data may include tolerances, geometric features for the part to be manufactured, time, cost, a set of tools that is required to machine the part, set-up and load time for the part to be manufactured, and/or manufacturability. Training data may include reject rate for the particular feature and specific manufacturing process. "Reject rate," as used herein, is defined as a percentage or number of parts that are rejected as not meeting one or more part specifications. For instance, reject rate may be 2%, indicating that 2% of parts produced with given specifications are rejected. Training data may include quality assurance check data such as a CMM measurement for each feature and each process type. Processor 108, machine learning module 116, or another device may use these training data to train a machine learning algorithm in accordance with the disclosure to generate a computer model as an output, where an outputted computer model is subject to one or more constraints such that the updated representative part model 152 is representative part model 140 with the appropriate updated tolerance datum 156. In other embodiments, training data may include correlations between corrections or alterations to tolerancing and dimensioning data and the subsequently produced representative part model. Training data may include any past corrections of the part stored in database 120 or a user input. Training data may be subject to human supervision, where one or more persons confirm that the correlations indicated by the training data are accurate. Outputs described above may then be applied to an updated representative part model 152. Processor 108 and/or machine learning module 116 may store, retrieve, exchange, and update information corresponding to training data, inputs, and/or outputs listed above on database 120 or any other suitable data storage location. In an embodiment, a suitable machine learning model or algorithm trained, performed, and/or instantiated with machine learning processes described above may include a supervised or unsupervised machine learning process; a regression model; a linear discriminant analysis; a quadratic discriminant model; a gradient descent model such as stochastic gradient descent; naïve Bayes model; decision tree model; neural network including convolutional neural network model; or models listed with reference to FIG. 4.

Continuing to refer to FIG. 1, the processor 108 is further configured to generate one or more manufacturing quotes 164. Manufacturing quote 164 may include one or more of updated tolerance datum 156, updated representative part model 152, and the manufacturability datum 148. Processor 108 may define one or more pricing parameters. "Pricing parameters" are parameters that influence a price or cost to manufacture a part. Examples of "pricing parameters" include, but are not limited to, material costs, fabrication costs, capital depreciation cost, assembly costs, tooling/setup costs, finishing costs, connection costs, handling costs, shipping costs, expediting costs, packaging costs, markups, margins, volume discounts, etc. Manufacturing quote 164 may be determined as a function of pricing parameters including tooling requirements, machine type, material, part geometry, part size, tolerance data, manufacturing time, labor, throughput, lead time, feature, feature size, material or materials, set-up time, reject rate, quality assurance measurement time, required tools or types of machines, and/or any relevant metric relating to manufacturability, tool availability, material availability, supply chain parameters, shipping speed or costs, material removal rate, area removal rate, total toolpath length, number of toolpath segments, or other parameters that may affect how much a part costs to manufacture. Processor 108 may define a baseline cost using a set of default parameters, for example a generic part made out of 316 steel and would take 4 hours to manufacture may be priced at $500 and the price may be varied based on quantity produced, desired tolerance, desired manufacturing method, machine availability, geometry (such as size, shape, dimensions, areas, configurations, numbers of components and other features, such as openings, recesses, bosses, etc.), connection type(s) and features, finish type(s), and purchased or otherwise pre-fabricated parts (e.g., hardware) and subassemblies (e.g., hinges), etc. Pricing parameters can be, for example, per-unit costs/prices or one-time costs/prices, depending on the particular parameter. Manufacturing quote 164 may be determined using machine learning, for instance as instantiated on processor 108 and/or machine learning module 116. For example, processor 108, machine learning module 116, or another device may train a machine learning model in accordance with this disclosure on training data correlating one or more of the above pricing parameters with one or more other pricing parameters or a total output cost. Processor 108 and/or machine learning module 116 may instantiate a machine learning model or algorithm trained by another device. For example, training data may correlate finish types, material, manufacturing method, and labor to overall manufacturing cost. Training data may be produced in a supervised manner, e.g. a person or persons examine the correlations indicated by training data and confirm the data represents accurate and factual correlations. Training data may be produced by detailed cost breakdown of previously generated production data. Training data may be produced in an unsupervised manner, e.g. correlations between parameters may be established within the training data based on a known method and used in a machine learning model or algorithm without human supervision. A trained machine learning algorithm may receive as inputs any of the above pricing or other recited manufacturing parameters and output a manufacturing quote 164, including, for example, price, time to manufacture, and/or time to ship the completed part(s). Processor 108 and/or machine learning module 116 may store, retrieve, exchange, and update information corresponding to training data, inputs, and/or outputs listed above on database 120 or any other suitable data storage location. In an embodiment, a suitable machine learning model or algorithm trained, performed, and/or instantiated with machine learning processes described above may include a supervised or unsupervised machine learning process; a regression model; a linear discriminant analysis; a quadratic discriminant model; a gradient descent model such as stochastic gradient descent; naïve Bayes model; decision tree model; neural network including convolutional neural network model; or models listed with reference to FIG. 4.

Continuing to refer to FIG. 1, manufacturing quote 164 may further comprise or be generated using a firm fabrication price quote. A "firm fabrication price quote" is a price at which a user can get one or more predefined parts and/or one or more instantiations of a part manufactured by a manufacturer. In other words, it is a price at which a fabricator commits to charging or otherwise honoring for a particular fabrication order. As described below in detail, a firm fabrication-price quote is determined as a function of actual fabrication resource requirements to which a fabricator is subjected.

Continuing to refer to FIG. 1, manufacturing quote 164 may comprise a datum indicating a suitable currency value to manufacture part to be manufactured 124. For example, manufacturing quote 164 may be a value in U.S. Dollars or other currency indicating how much it would cost to manufacture part to be manufactured 124. Manufacturing quote 164 may be modified in accordance with the number of parts to be manufactured, for instance if more than one part is to be manufactured. Manufacturing quote 164 may be a datum indicating any suitable compensation for the manufacturing of part to be manufactured 124. For example, aside from a currency value, manufacturing quote 164 may indicate a part to be manufactured 124 could be manufactured in exchange for a service (such as the installation of equipment in the manufacturing facility producing the quote), a number of labor hours (offered, for instance, to employees of the manufacturing facility producing the quote), a payment over time, a percentage of equity in a property, company, or the like, tickets to a sporting or entertainment event, or any suitable compensation. In an embodiment, currency may be fiat currency or cryptocurrency. In an embodiment, manufacturing quote 164 is determined by an economic model using price data (e.g. bids for a manufacturing quote from a supplier), for example from existing suppliers. In an embodiment, manufacturing quote 164 may be determined by geographical location of the fabrication facility, and for instance may take into account labor cost, tax, transportation cost, and the like. In an embodiment, manufacturing quote 164 may be determined using a supply and demand model or similar microeconomic model. In an embodiment, manufacturing quote 164 may be in a weight of precious metals, gems, stones, jewelry, or the like. In an embodiment, manufacturing quote 164 may indicate any object suitable as compensation to the entity operating apparatus 100 in exchange for manufacturing a requested part. In an embodiment, processor 108 may generate a manufacturing quote 164 for the part to be manufactured 124 as originally submitted via part information 128, as well as a manufacturing quote 164 based on updated tolerance datum 156. This may allow user 184 to compare the impact of updating tolerance datum 136 on the price of manufacturing a part and help reinforce how to better make decisions regarding engineering and manufacturing tradeoffs.

Continuing to refer to FIG. 1, processor 108 may generate an alternate manufacturing quote using a second quoting process as a function of the manufacturability datum 148 of the part to be manufactured and the identification of an unmanufacturable feature or difficult to machine feature. An "alternate manufacturing quote," as used herein, is a second manufacturing quote that is generated describing parts and/or features that cannot be easily manufactured or manufactured at all and may be included in manufacturing quote 164. In some embodiments, alternate manufacturing quote may be generated after manufacturing quote 164. In other embodiments, alternate manufacturing quote may be generated in tandem with manufacturing quote 164. In embodiments, processor 108 may be configured to transmit alternate manufacturing quote to user interface 188. In a nonlimiting example, both manufacturing quote 164 and alternate manufacturing quote may be transmitted at the same time to a user interface 188, where user can see information related to parts to be manufactured and parts/features that cannot be manufactured. In some embodiments, alternate manufacturing quote may include only costs for manufacturable features and/or hard-to-manufacture features (i.e. features that have a manufacturability datum 148 below a threshold). In other embodiments, alternate manufacturing quote may include only costs related to manufacturability datum 148. In an embodiment, alternate manufacturing quote may be generated as a function of a second quoting process. A "second quoting process," as used herein, is the process of generating a second manufacturing quote. In some embodiments, second quoting process may occur after the first manufacturing quoting process. In some embodiments, second quoting process may provide user 184 information related to parts and/or features that cannot be easily manufactured or manufactured at all. In some embodiments, alternate manufacturing quote may include costs related to parts deemed too expensive to manufacture. In some embodiments, alternate manufacturing quote may list the parts and/or features deemed unmanufacturable. In a nonlimiting example, user may be provided with alternate manufacturing quote as to provide information as to what parts cannot be manufacturable, where alternate manufacturing quote may allow user to make a new quoting request with a different set of part information 128.

With continued reference to FIG. 1, processor 108 may be configured to identify unmachinable qualities of the part and may include these unmachinable qualities in manufacturing quote 164. As used in the current disclosure, "unmachinable qualities" is any quality of the part to be manufactured causes the part to be determined as unmachinable. In a non-limiting example, qualities that make a part unmachinable may include workpiece material deteriorations, tolerances, geometric features for the part to be manufactured, surface roughness, time, cost, a set of tools, fixturing system, tool accessibility, set-up and load time for the part to be manufactured 124, manufacturability datum 148, and the like. If the given quality for a part is outside a predetermined range for any of these considerations the part may be considered unmachinable. The unmachinable qualities of the part may be displayed within the manufacturing quote 164 or on the user interface 188.

Continuing to refer to FIG. 1, manufacturing quote 164 may include a written description of the part for manufacture 124. Additionally in a non-limiting example, manufacturing quote 164 may include a materials list, time to manufacture, cost to manufacture, equipment used, the dimensions of the finished part, weight of the part, part number, and the like. A manufacturing quote 164 may also include the geometrical tolerances calculated as a function of semantic datum to go with each feature of the part. A manufacturing quote 164 may include a recommendation of which work materials to use to manufacture the part. In some embodiments, a manufacturing quote 164 may include suggested methods of assembly for the part. A manufacturing quote may also include suggestions on the most efficient order of assembly for the part. Additionally, a manufacturing quote 164 may make suggestions for corrections to an unmachinable part in order to make it machinable or manufacturable. A manufacturing quote may include an automatically revised design. These suggestions may include varying the tolerances for various features, changing the material of the part, and/or altering the part design as outlined above.

Continuing to refer to FIG. 1, processor 108 may be configured to identify corrections to the part to improve machinability. Corrections to the part may include suggestions to use a different material that is more machinable. In other embodiments, corrections may include suggesting a larger tolerance for a particular feature of the part for manufacture 124. Slight changes to the geometry of the features of the part may also be suggested to improve manufacturability. In embodiments. Processor 108 may determine that what correction needs to be made by using a combination of any of outputs 144 including manufacturability datum 148, updated representative part model 152, and updated tolerance datum 156. For example, if a tolerance indicated by tolerance datum 136 is too small for a given feature, processor 108 may suggest relaxing that tolerance. In another nonlimiting example, if a part is unmachinable due to a particular geometric feature, processor 108 may make a suggestion that entails removing or altering that geometric feature. Processor 108 may be configured to output a plurality of different suggestions to improve machinability of the part for manufacture 124. Part corrections may be included within the manufacturing quote 164 or displayed on the user interface 188.

Continuing to refer to FIG. 1, processor 108 is further configured to transmit outputs 144 comprising the at least one updated tolerance datum 156, the at least one manufacturability datum 148, the manufacturing quote 164, updated print 160, and/or the updated representative part model 152 of the part to be manufactured 124 to a user interface 188. Processor 108 may further transmit rationales 172, indication of updates 168, information for user 176, and recommended parameter modification 180. Processor 108 may transmit any one, all, or a combination of the foregoing. In an exemplary embodiment, processor 108 may transmit the manufacturing quote 164 and updated representative part model 152 to the user interface 188 so the user can see how much it would cost to manufacture the part as well as what was changed in the model. Processor 108 may additionally transmit an indication of updates 168 informing the user of what was changed and why the changes were made to any of updated tolerance datum 156, updated print 160, manufacturability datum 148, manufacturing quote 164, and/or updated representative part model 152, as well as what effect any changes had on the manufacturing quote 164. As used herein, "indication" is defined as anything that conveys information. An indication may comprise a datum, data, signal, notification, warning, alert, noise or sound, transmission of light, vibration or other haptic feedback, or any general transmission, exchange, creation, copying, or shifting of information. Indication of updates 168 may comprise a message, visual information (e.g. an image or moving picture), audible information, a color or color coding of presented information, a number, a list, a printout, a file, a table, a graph, or any suitable format. In an embodiment, processor 108 may be further configured to receive one or more requests for additional information from a user 184 via user interface 188 or via another method. In an embodiment, processor 108 may be further configured to receive an indication from user 184 that one or more parameters of part information 128 are fixed. This may require that the processor 108 regenerate one or more of updated tolerance datum 156, updated print 160, manufacturability datum 148, manufacturing quote 164, rationales 172 and/or updated representative part model 152 based on the fixed parameters. For example, upon presentation of outputs 144 to user 184 via the user interface 188, the user may notice that an updated tolerance datum 156 has been loosened too much and would not allow for a press fit of another mated part. User 184 may provide an indication through user interface 188 or another means that the updated tolerance datum 156 has been loosened too much, and processor 108 may subsequently regenerate outputs 144 with the new tolerance constraints. User 184 may accept or reject the manufacturing quote 164 via user interface 188.

Continuing to refer to FIG. 1, user interface 188 may be a computing device with display, such as a desktop or laptop computer, smartphone, tablet, wearable, smart watch or another computing device in accordance with the present disclosure. In an embodiment, user interface 188 may comprise a speaker and/or microphone. In an embodiment, user interface 188 may comprise a touch screen or digital writing device. User interface 188 may comprise one or more means for receiving user input such as a keyboard, mouse, button, touchscreen, knob, dial, slider, switch, or the like. User interface 188 may comprise one or more means for providing output such as a display, speaker, vibrating motor (such as the type for vibrating smartphones), LED, light, buzzer, alarm, or the like. In an embodiment, user interface 188 may comprise an e-reader. User interface 188 may comprise an internet interface. User interface 188 may include, without limitation, a transmission of communication with at least a computing device; transmission may include any transmission as described herein. A user interface 188 may include an additional computing device, such as a mobile device, laptop, desktop computer, or the like. Persons skilled in the art, upon reviewing the entirety of this disclosure, will be aware of various devices which may be suitable for use as user interface 188 consistent with this disclosure.

Continuing to refer to FIG. 1, processor 108 is configured to transmit a recommended parameter modification to user interface 188 indicating to a user how to select at least one parameter of the part information 128 such that at least one corresponding manufacturability datum 148 would be improved. For example, after receiving part information 128 and calculating outputs 144, processor 108 may send user 184 information illustrating why a particular tolerance datum 136 was changed and how the change affected manufacturing quote 164. If a user selected a feature such as a through hole to have a tolerance that would allow for an interference fit, but the part that would interface with the through hole only required a clearance fit, then a much looser tolerance for the through hole could be chosen. Selection of a looser tolerance may allow for decreased production time and overall part cost, which would in turn improve manufacturability datum 148. This information may be presented to user 184 via user interface 188. This may allow a user to be given feedback or otherwise "trained" using user interface 188. In an embodiment, information transmitted to user 184 indicating how to select at least one parameter of the part information 128 such that at least one corresponding manufacturability datum 148 would be improved may comprise a message, visual information (e.g. an image or moving picture), audible information, a color or color coding of presented information, a number, a list, a printout, a file, a table, a graph, or any suitable datum communicating the desired information to user 184.

Continuing to refer to FIG. 1, processor 108 may use an event handler to handle a user response to recommended parameter modification via user interface 188. An "event handler," as used in this disclosure, is a module, data structure, function, and/or routine that performs an action on remote device in response to a user interaction with event handler graphic. As used in this disclosure, an "event handler graphic" is a graphical element with which a user of user interface 188 may interact to enter data, for instance and without limitation for a search query or the like as described in further detail below. An event handler graphic may include, without limitation, a button, a link, a checkbox, a text entry box and/or window, a drop-down list, a slider, or any other user interaction graphical object that may occur to a person skilled in the art upon reviewing the entirety of this disclosure. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handler may convert data into expected and/or desired formats, for instance such as date formats, currency entry formats, name formats, or the like.

Continuing to reference FIG. 1, an event handler may include a cross-session state variable. As used herein, a "cross-session state variable" is a variable recording data entered on remote device during a previous session. Such data may include, for instance, previously entered text, previous selections of one or more elements as described above, or the like. For instance, cross-session state variable data may represent a search a user entered in a past session. Cross-session state variable may be saved using any suitable storage, including database 120 or memory 112. For instance, data may be saved wholly or in part as a "cookie" which may include data or an identification of remote device to prompt provision of cross-session state variable by processor 108, which may store the data on memory 112 or database 120. Alternatively, or additionally, processor 108 may use login credentials, device identifier, and/or device fingerprint data to retrieve cross-session state variable, which processor 108 may transmit to remote device. Cross-session state variable may include at least a prior session datum. A "prior session datum" may include any element of data that may be stored in a cross-session state variable. An event handler graphic may be further configured to display the at least a prior session datum, for instance and without limitation auto-populating user query data from previous sessions.

Continuing to refer to FIG. 1, information transmitted to user interface 188 indicating to a user how to select at least one parameter of the part information 128 such that at least one corresponding manufacturability datum 148 would be improved may be generated using machine learning. Machine learning module 116 may generate information for user 176 such as a message, visual information (e.g. an image or moving picture), audible information, a color or color coding of presented information, a number, a list, a printout, a file, a table, a graph, or any suitable datum communicating the desired information to user 184 based on training inputs provided to a machine learning algorithm on machine learning module 116. For example, training inputs may comprise data indicating a series of parts to be manufactured submitted by a user and various modalities of communicating changes to the user about how to choose parameters for the submitted parts. The data may indicate that over time a user made increasingly optimal choices when the information regarding changes to user-chosen parameters was presented in a particular way, such as via visual illustration rather than audible information. The machine learning module 116 could then weight a visual illustration modality more heavily than an audible information modality and thereby improve the efficacy of communicating changes to part information 128 to the user.

Continuing to refer to FIG. 1, processor 108 is configured to include one or more rationales in the information transmitted to the user interface 188 indicating to a user 184 how and/or why to select at least one parameter of the representative part model 140 such that at least one corresponding manufacturability datum 148 would be increased. In an embodiment, processor 108 may indicate that a particular tolerance is not possible given the selection of material for the part to be manufactured 124. For example, if a user submits a part to be manufactured 124 and indicates the part is to be made out of titanium, the grain structure and strength of the material may preclude a tolerance below a threshold, for example ±1 mm. If a user submits part information 128 with tolerance datum 136 indicating a tolerance of ±0.001 mm, the information transmitted to the user interface 188 may include a message informing the user 184 that updated tolerance datum 156 has been loosened because of the properties of the titanium material selection. This may provide the user with educational feedback to allow them to make improved engineering and design decisions in future manufacturing requests. In an embodiment, a rationale may be presented as a message, visual information (e.g. an image or moving picture), audible information, a color or color coding of presented information, a number, a list, a printout, a file, a table, a graph, or any suitable datum communicating the desired information to user 184. Exemplary rationales may include an engineering rationale, a design rationale, a material rationale, a manufacturing method rationale, a logical rationale, a price or cost rationale, a material availability rationale, an economic rationale, a supply chain rationale, a machinability rationale, a manufacturability rationale, a labor requirement rationale, a mathematical rationale, a geometrical rationale, a time rationale, or any other suitable rationale.

Continuing to refer to FIG. 1, the processor 108 may dynamically correlate a first user-submitted design parameter with a previously existing improvement to a second design parameter. "Dynamically" as used herein is defined as being in response to an interaction between processor 108 and user 184. "Previously existing," as used herein, is defined as existing prior to the submission of the first user-submitted design parameter. "A first user-submitted design parameter" is a datum related to a design submitted by the user, and may include one or more descriptive attributes including any features, limitations, details, restrictions, specifications, part geometry, material, finish, connections, hardware, special processes, dimensions, tolerances, manufacturing methods, tools, tooling requirements, lead time, throughput, part features, part volume, part area, part weight, representative part model, format of part model, print, 2D representation, 3D representation, type or types of fits, surfaces, edges, openings, shapes, computer files, CAD drawings, computer-aided machining (CAM) files, and the like. The processor 108 may correlate such a parameter with a previously existing improvement to a design parameter, for example by correlating that changing a design parameter of the same type as the first user-submitted design parameter has previously lead to an improvement in a second design parameter. Second design parameter may be of the same type or a similar type to any of the above-listed first user-submitted design parameters. Second design parameter may be a modification of the first user-submitted design parameter. For example, a first user-submitted design parameter may be a tolerance. Processor 108 may dynamically determine that altering a tolerance in a previous part lead to an improvement in manufacturing time for a similar part. Processor 108 and/or machine learning module 116 may utilize a machine learning classifier in accordance with the disclosure to classify the first user-submitted design parameter. For example, a classifier may be configured to output at least a datum that labels or otherwise identifies a set of data that are clustered together, found to be close under a distance metric as described below, or the like. Machine-learning module 116 may generate a classifier using a classification algorithm, defined as a process whereby a computing device and/or any module and/or component operating thereon derives a classifier from training data. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, processor 108 and/or machine learning module 116 may classify elements of training data into different machining methods, such as milling, turning, electrical discharge machining, water jet, drilling, and so on. Processor 108 and/or machine learning module 116 may further classify machining methods based on smallest possible tolerances, such as machining methods capable of reaching ±0.01 mm, machining methods capable of reaching ±0.001 mm, machining methods capable of reaching ±0.0001 mm, etc. Processor 108 and/or machine learning module 116 may classify elements of training data based on parts made of the same or similar materials, parts occupying a similar total volume, parts with the same or similar largest and smallest dimensions, parts with an overall cost similar to an estimated cost of the part to be manufactured 124, parts made to perform the same or similar function as part to be manufactured 124, parts made for the same entity or user as part to be manufactured 124, parts created using a particular machining method or group of machining methods, or any suitable selection criteria. Processor 108 may retrieve data corresponding to second design parameter and existing improvements to second design parameters from database 120, memory 112, machine learning module 116, or any suitable source.

Continuing to refer to FIG. 1, once the first user-submitted design parameter is classified, processor 108 and/or machine learning module 116 may correlate the first user-submitted design parameter with a previously existing improvement to a second design parameter. This may be performed by processor 108 and/or machine learning module 116. Correlating a first user-submitted design parameter with a previously existing improvement to a second design parameter may include determining that changing a parameter of the same type as the first user-submitted design parameter has previously lead to an improvement of a second design parameter. For instance, the first user-submitted design parameter may be a tolerance. Processor 108 may correlate that the second design parameter of cost related to a previously existing part similar to part 124 had been improved by increasing tolerances. Parameters may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories.

Continuing to refer to FIG. 1, the processor 108 is configured to initiate manufacturing of a part, for example part to be manufactured 124. In an embodiment, the processor 108 may initiate manufacturing by facing or sizing a material stock in an automated CNC machine. In an embodiment, the processor 108 may initiate manufacturing by purchasing material that the part to be manufactured 124 is to be made from. In an embodiment, the processor 108 may initiate manufacturing by confirming to the user 184 that manufacturing may proceed. In an embodiment, the processor 108 may initiate manufacturing by transmitting one or more outputs 144 to a computing device within a manufacturing facility, machine shop, or elsewhere, indicating that manufacturing of the part may occur. In an embodiment, the processor 108 may initiate manufacturing by scheduling use of one or more machines for the part to be manufactured 124.

Figure 2:
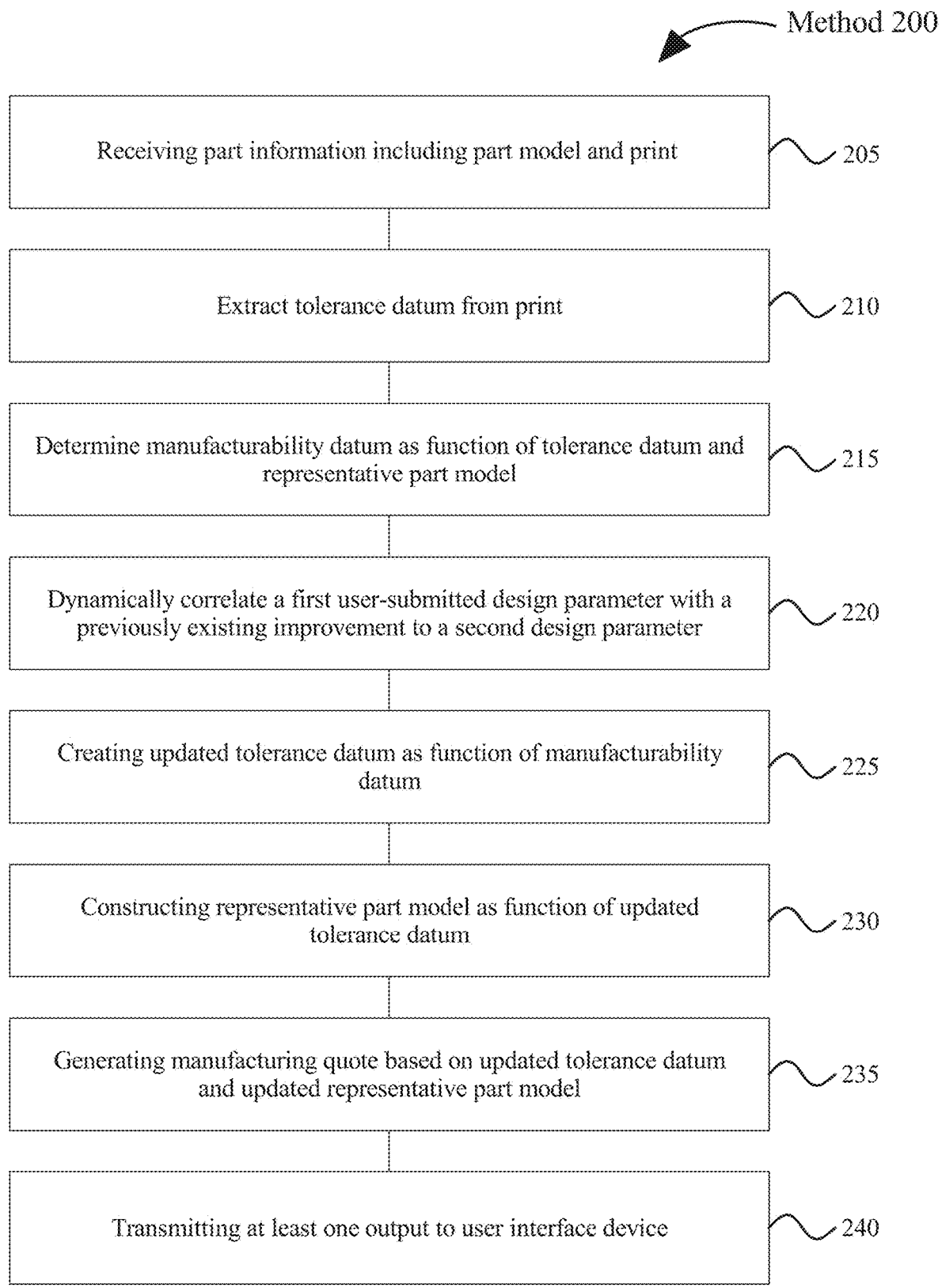
FIG. 2 is a flow diagram illustrating a method of dimensioning and modifying a part to be manufactured.

Referring now to FIG. 2, an exemplary method 200 for dimensioning and modifying a part to be manufactured is illustrated. Method 200 comprises steps 205-235 and may be performed using some or all of the elements described in apparatus 100 of FIG. 1. At step 205, of a processor receives part information for the part to be manufactured, wherein the part information for the part to be manufactured includes a representative part model of the part to be manufactured and a print of the part to be manufactured. At step 210, the processor extracts at least one tolerance datum from the print. At step 215, the processor determines at least one manufacturability datum as a function of the at least one tolerance datum and the representative part model of the part to be manufactured. At step 220, the processor creates at least one updated tolerance datum as a function of the at least one manufacturability datum. At step 225, the processor constructs an updated representative part model of the part to be manufactured as a function of the at least one updated tolerance datum. At step 230, the processor generates a manufacturing quote based on the at least one updated tolerance datum and the updated representative part model of the part to be manufactured. At step 235, the processor transmits the at least one updated tolerance datum, the at least one manufacturability datum, the manufacturing quote, and/or the updated representative part model of the part to be manufactured to a user interface.

Continuing to refer to FIG. 2, at step 205 a processor receives part information for the part to be manufactured, wherein the part information for the part to be manufactured includes a representative part model of the part to be manufactured and a print of the part to be manufactured. This step may be implemented in accordance with the actions and elements described with respect to processor 108, part information 128, part to be manufactured 124, representative part model 140, and print 132 in FIG. 1 above and figures described below.

Continuing to refer to FIG. 2, at step 210 the processor extracts at least one tolerance datum from the print. This step may be implemented in accordance with the actions and elements described with respect to processor 108, tolerance datum 136, and print 132 in FIG. 1 above and figures described below.

Continuing to refer to FIG. 2, at step 215 the processor determines at least one manufacturability datum as a function of the at least one tolerance datum and the representative part model of the part to be manufactured. This step may be implemented in accordance with the actions and elements described with respect to processor 108, manufacturability datum 148, tolerance datum 136, representative part model 140, and part to be manufactured 124 in FIG. 1 above and figures described below.

Continuing to refer to FIG. 2, at step 220, the processor dynamically correlates a first user-submitted design parameter with a previously existing improvement to a second design parameter. This step may be implemented in accordance with the actions and elements described with respect to processor 108, machine learning module 116, database 120, and part information 128 in FIG. 1 above and figures described below.

Continuing to refer to FIG. 2, at step 225 the processor creates at least one updated tolerance datum as a function of the at least one manufacturability datum. This step may be implemented in accordance with the actions and elements described with respect to processor 108, updated tolerance datum 156, and manufacturability datum 148 in FIG. 1 above and figures described below.

Continuing to refer to FIG. 2, at step 230, the processor constructs an updated representative part model of the part to be manufactured as a function of the at least one updated tolerance datum. This step may be implemented in accordance with the actions and elements described with respect to processor 108, representative part model 140, part to be manufactured 124, and updated tolerance datum 156 in FIG. 1 above and figures described below. In some embodiments, the processor 108 further creates an updated print 160 that incorporates updated tolerance datum 156.

Continuing to refer to FIG. 2, at step 235, the processor generates a manufacturing quote based on the at least one updated tolerance datum and the updated representative part model of the part to be manufactured. This step may be implemented in accordance with the actions and elements described with respect to processor 108, manufacturing quote 164, updated tolerance datum 156, updated representative part model 152, and part to be manufactured 124 in FIG. 1 above and figures described below.

Continuing to refer to FIG. 2, at step 240, the processor transmits the at least one updated tolerance datum, the at least one manufacturability datum, the manufacturing quote, and/or the updated representative part model of the part to be manufactured to a user interface. This step may be implemented in accordance with the actions and elements described with respect to processor 108, updated tolerance datum 156, updated representative part model 152, part to be manufactured 124, and user interface 188 in FIG. 1 above and figures described below. In some embodiments, the transmitted datum or data may include an indication of updates made by the processor 108. In some embodiments, updated print 160 may be transmitted to the user interface 188. In some embodiments, processor 108 further transmits information to the user interface 188 indicating to a user 184 how to select at least one parameter of the part information 128 such that at least one corresponding manufacturability datum 148 would be improved. In some embodiments, the information transmitted to the user interface 188 indicating to a user 184 how to select at least one parameter of the representative part model 140 such that at least one corresponding manufacturability datum 148 would be increased is generated using a trained machine learning model. In some embodiments, the information transmitted to the user interface 188 indicating to a user 184 how to select at least one parameter of the representative part model 140 such that at least one corresponding manufacturability datum 148 would be increased includes one or more rationales 172. In some embodiments, the processor 108 is configured to receive an indication from the user 184 that one or more parameters of the part information 128 are fixed.

Continuing to refer to FIG. 2, in some embodiments of method 200, any of outputs 144 including updated tolerance datum 156, manufacturability datum 148, manufacturing quote 164, and/or updated representative part model 152 are generated using a trained machine learning model.

Figure 3A:
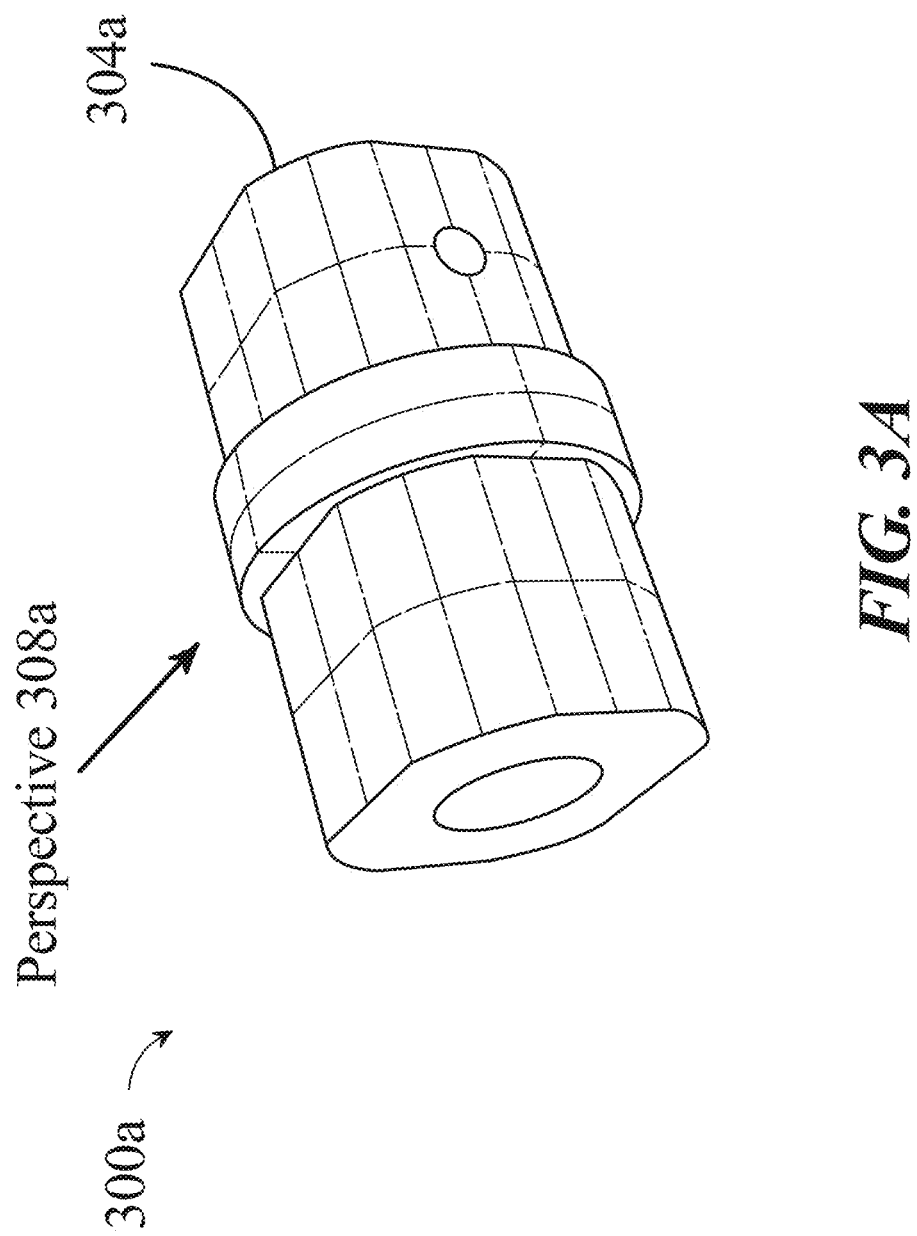
FIG. 3A illustrates an exemplary part model in accordance with various steps of a method of dimensioning and modifying a part to be manufactured
Figure 3B:
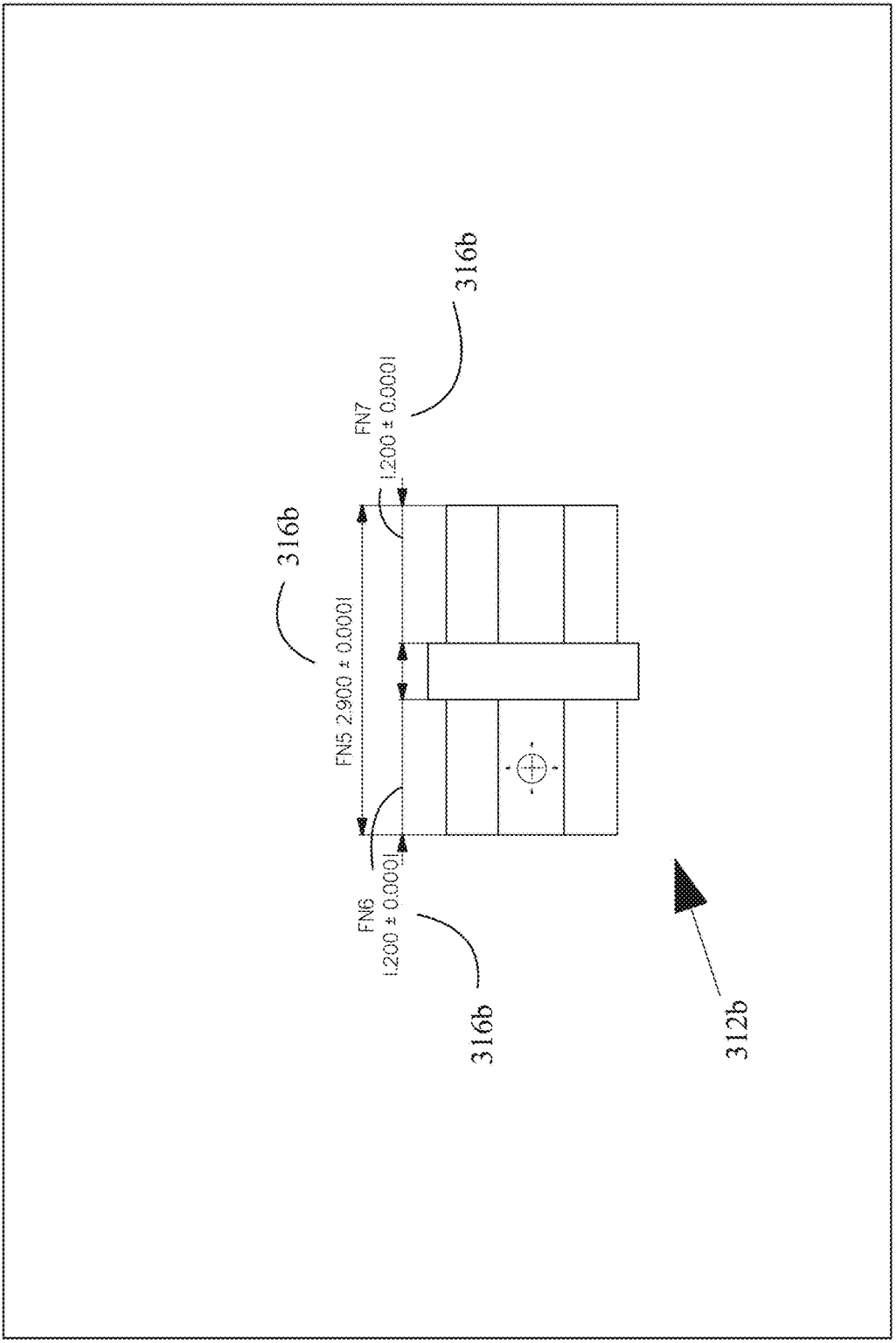
FIG. 3B illustrates particular implementations of various steps of a method of dimensioning and modifying a part to be manufactured
Figure 3C:
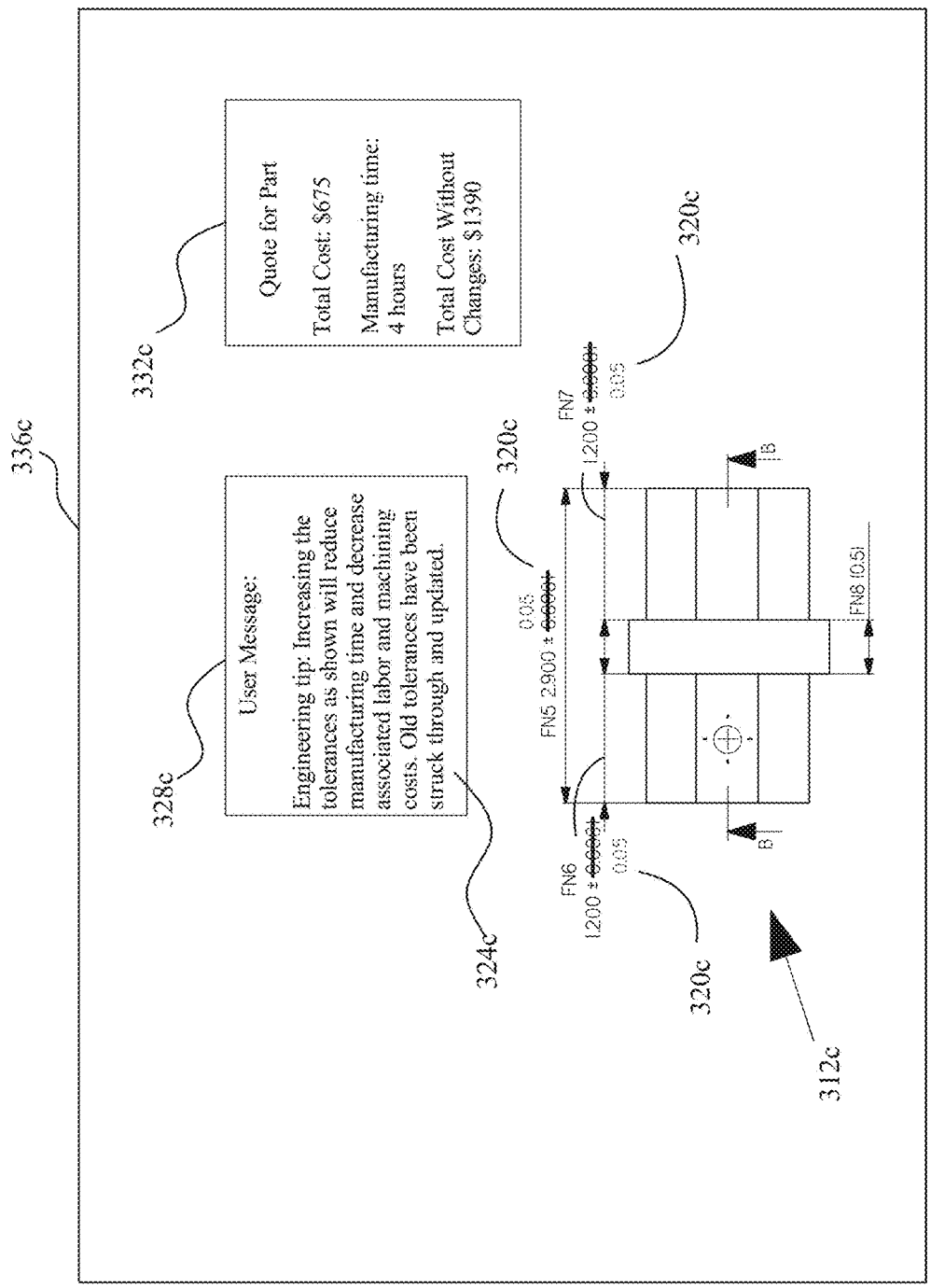
FIG. 3C illustrates particular implementations of various steps of a method of dimensioning and modifying a part to be manufactured.

Referring now to FIG. 3A, an exemplary representative part model 300a is shown. 300a is a three-dimensional view of a part to be manufactured 304a in accordance with the apparatus and method of FIGS. 1 and 2 as outlined above. A particular perspective 308a of part 304a is shown in FIGS. 3B and 3C as prints 300. Representative part model 300a may be an exemplary portion of part information 128 in FIG. 1.

Referring now to FIG. 3B, print 312b of perspective 308a from FIG. 3A is shown. Print 312b illustrates tolerance datum 316b, which has been chosen as ±0.0001 mm. The processor receives the part information including representative part model 300a shown in FIG. 3A and print 312b shown in FIG. 3B and extracts tolerance datum 316b. The processor determines a manufacturability datum corresponding to the representative part model 300a and tolerance datum 316b.

Now referring to FIG. 3C, the processor creates updated tolerance datum 320c based on the manufacturability datum and constructs an updated representative part model with the updated tolerance datum 320c, as well as an updated print 312c. Based on the determined manufacturability datum, the processor determines that the tolerance datum 316b are sub-optimal and should be increased to lower the associated manufacturing cost. The processor determines an appropriate increase in tolerance from ±0.0001 mm to ±0.05 mm and creates an updated print 312c reflecting the change. The updated print 312c, updated tolerance datum 316c, indication of updates 324c (also shown as the strikethroughs themselves), engineering rationale for updates 328c, and manufacturing quote 332c are sent to user interface 336c. User interface 336c is illustrated here as a computer display.

Continuing to refer to FIG. 3C, a user can see from the displayed information why tolerance datum 320c was changed. Particularly, the user is presented with a message indicating that the change in tolerance datum from 316b to 320c will reduce manufacturing time and decrease associated labor and machining costs. The user is further presented with a manufacturing quote 332c showing the price for manufacturing the part, how long the part will take to manufacture, and how much the part would have cost to manufacture had the tolerance datum 320c not been updated.

Figure 4:
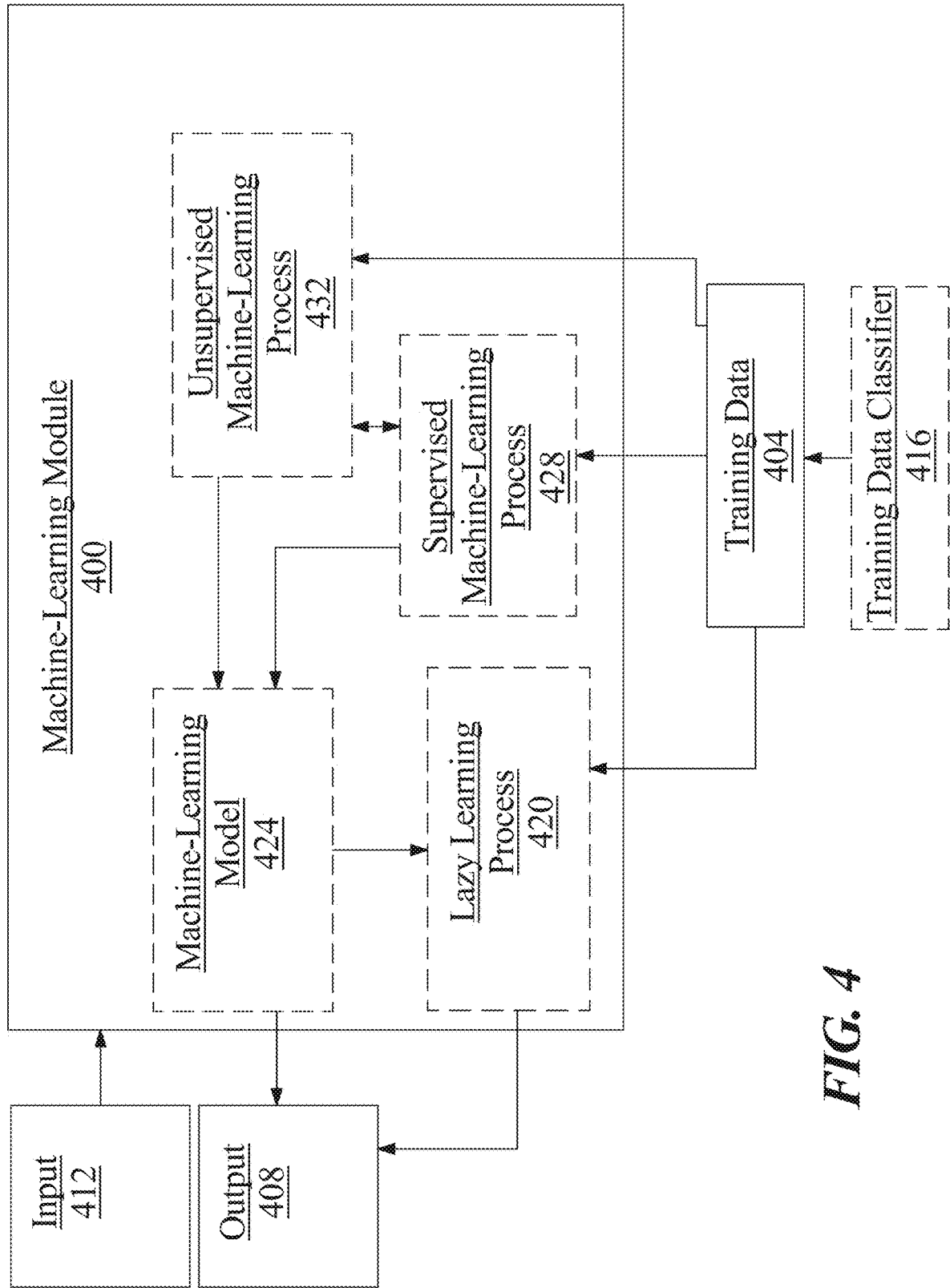
FIG. 4 is a block diagram illustrating a machine learning module in accordance with aspects of the invention.

Referring now to FIG. 4, an exemplary embodiment of a machine learning module 400 is described in detail. With reference to FIG. 1, machine learning module 116 may be identical or similar to machine learning module 400 in FIG. 4. Machine learning module 400 may be either a software module stored on memory 112, database 120, or a separate storage device; or machine learning module 400 may be a separate hardware module as part of computing device 104. In an embodiment, machine learning module 400 may comprise separate non-volatile storage such as a hard disk, solid state drive, or cloud storage. Machine learning module 400 may be communicatively coupled with database 120 and retrieve data from database 120, while running computations on machine learning module 400. Machine learning module 400 may be programmed with one or more machine learning algorithms as outlined below.

Continuing to refer to FIG. 4, an exemplary embodiment of a machine-learning module 400 that may perform one or more machine-learning processes as described in this disclosure is illustrated. Machine-learning module 400 may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example training data 404 may correlate tolerance values with manufacturability. Machine learning module 400 may correlate larger tolerances with cheaper and more quickly manufactured parts or may associate certain manufacturing methods with machining times that are independent of selected tolerance throughout the possible range of tolerances.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data into different machining methods, such as milling, turning, electrical discharge machining, water jet, drilling, and so on. Training data classifier 416 may further classify machining methods based on tightest possible tolerances, such as machining methods capable of reaching ±0.01 mm, machining methods capable of reaching ±0.001 mm, machining methods capable of reaching ±0.0001 mm, etc. Training data classifier 416 may classify elements of training data based on parts made of the same or similar materials, parts occupying a similar total volume, parts with the same or similar largest and smallest dimensions, parts with an overall cost similar to an estimated cost of the part to be manufactured 124, parts made to perform the same or similar function as part to be manufactured 124, parts made for the same entity or user as part to be manufactured 124, parts created using a particular machining method or group of machining methods, or any suitable selection criteria.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
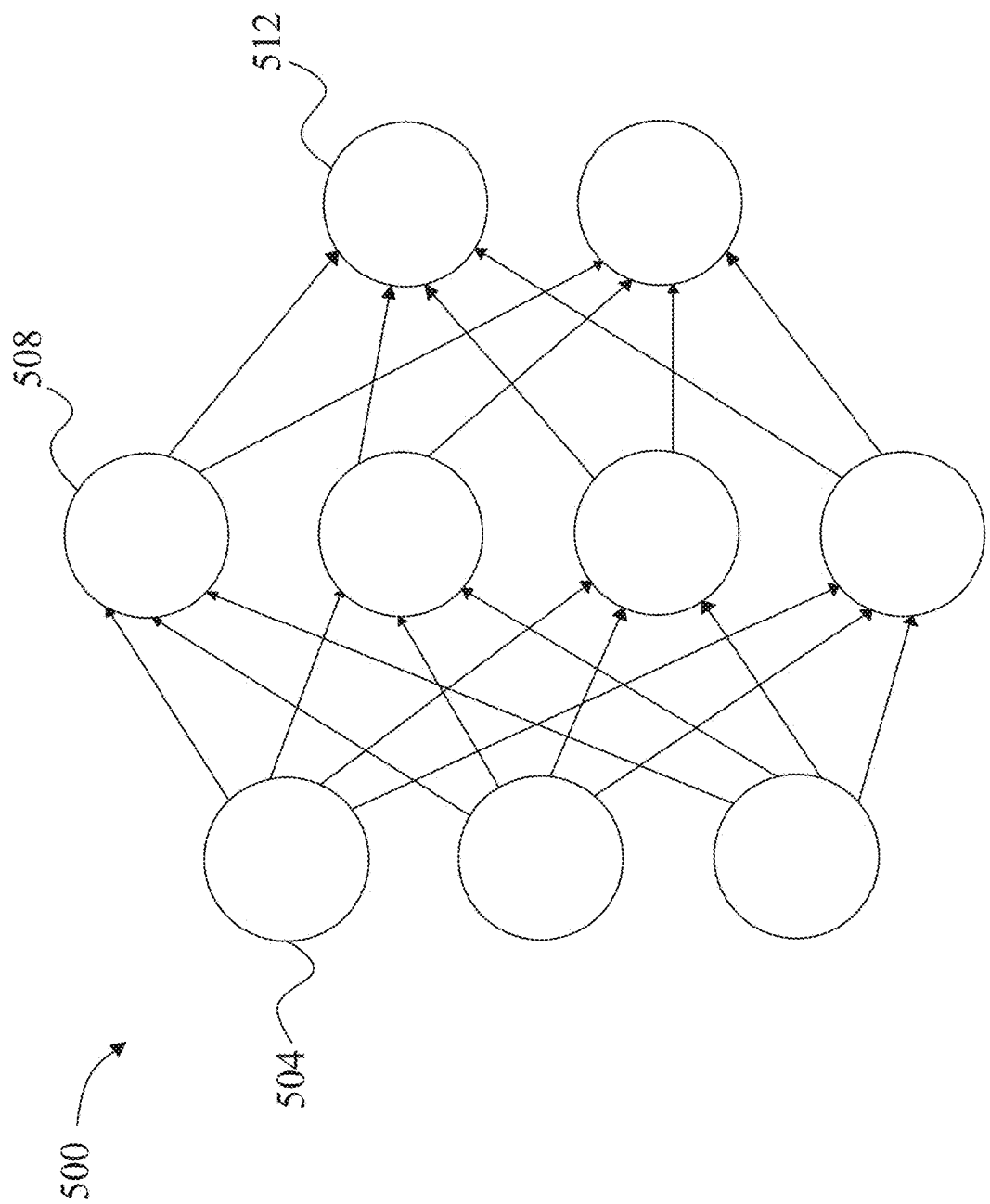
FIG. 5 is a diagram illustrating a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
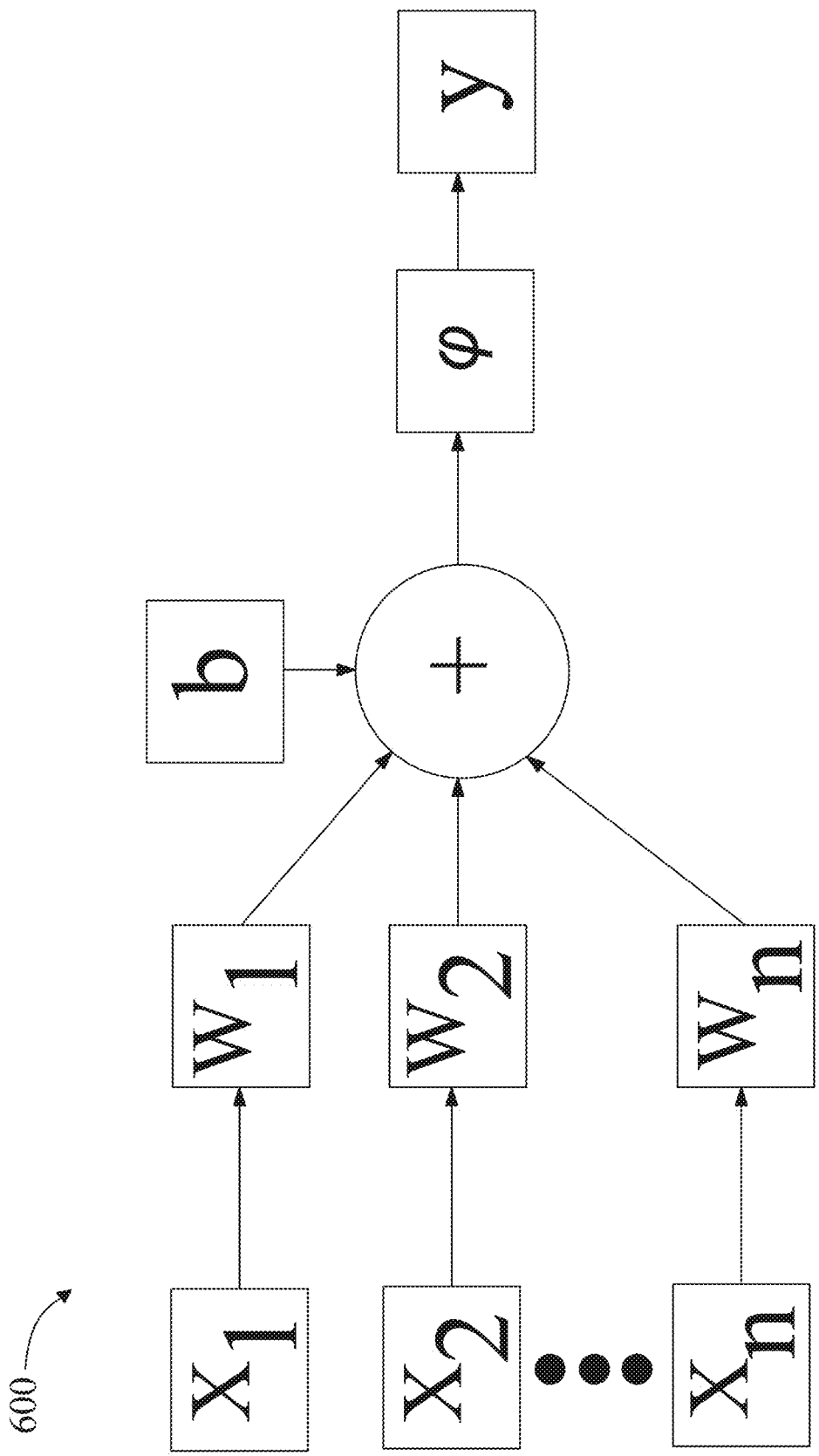
FIG. 6 is a diagram illustrating a node of a neural network.

Referring now to FIG. 6, an exemplary embodiment of a node 6600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tan h(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function ω, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
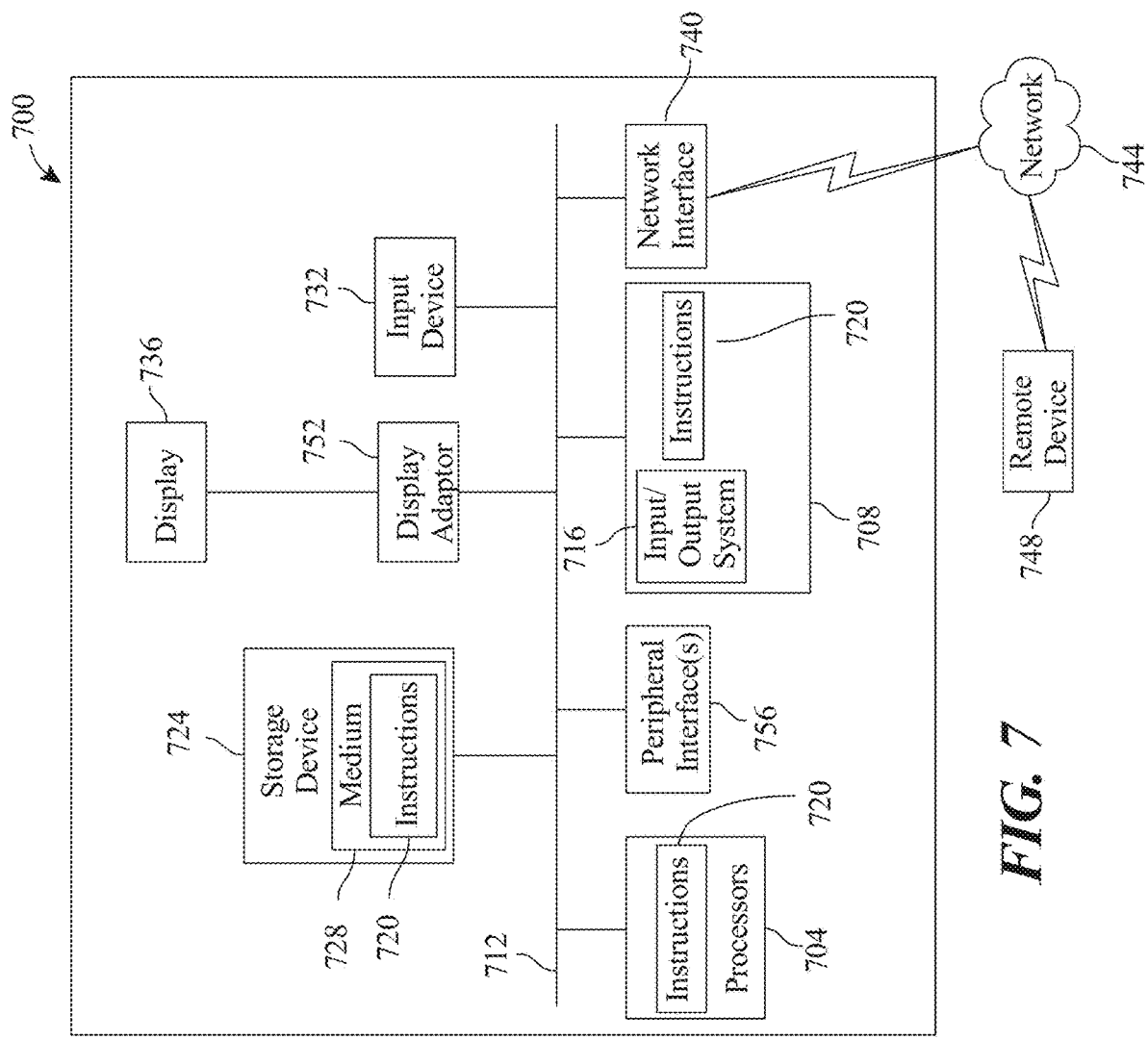
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, machine learning, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, and software according to the present disclosure. Accordingly, this description is meant to be taken only by way of example, and not to otherwise limit the scope of this invention.

If not sufficiently clear from contextual or plain and ordinary usage, the terms "about," "around," "relatively," "approximately," and "substantially," when used to modify a value, number, figure, quantity, or other term, can be understood to mean±20% of the modified value, inclusive. For instance, if not sufficiently clear from contextual or plain and ordinary usage, "about 10" can be understood to mean "from 8 to 12 inclusive". As a further example, if the term "relatively high" is used, one of ordinary skill in the art would know what an instance of "high" would mean and know that "relatively high" was within about 20% of that.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for dimensioning and modifying a part to be manufactured, the apparatus comprising:
    at least one processor; and
    a memory communicatively connected to the processor, the memory containing instructions configuring the processor to:
        receive part information for a part to be manufactured, wherein the part information for the part to be manufactured includes a representative part model of the part to be manufactured and a print of the part to be manufactured;
        extract at least one tolerance datum from the print;
        determine at least one manufacturability datum as a function of the at least one tolerance datum and the representative part model of the part to be manufactured;
        dynamically correlate a first user-submitted design parameter with a previously existing improvement to a second design parameter;
        create at least one updated tolerance datum as a function of the at least one manufacturability datum by training an unsupervised machine-learning model configured to identify changes to tolerance datum that improve manufacturability using training data, wherein the training data comprises a data set correlating tolerance data and past corrections related to a part previously created by the processor to manufacturability;
        construct an updated representative part model of the part to be manufactured as a function of the at least one updated tolerance datum;
        generate a manufacturing quote based on the at least one updated tolerance datum and the updated representative part model of the part to be manufactured; and
        transmit the manufacturing quote to a user interface.

2. The apparatus of claim 1, wherein the processor is further configured to transmit an indication of one or more updates made by the processor.

3. The apparatus of claim 1, wherein the manufacturing quote includes one or more of the at least one updated tolerance datum, the updated representative part model of the part to be manufactured, and the manufacturability datum.

4. The apparatus of claim 1, wherein the processor is further configured to:
    create an updated print of the part to be manufactured; and
    transmit the updated print to the user interface.

5. The apparatus of claim 4, wherein the updated print of the part to be manufactured incorporates the at least one updated tolerance datum.

6. The apparatus of claim 1, wherein the processor is further configured to transmit, to the user interface, a recommended parameter modification.

7. The apparatus of claim 6, wherein the processor is further configured to generate the recommended parameter modification using a machine learning model trained using data including at least the previously existing improvement to the second design parameter.

8. The apparatus of claim 7, wherein the recommended parameter modification includes one or more rationales.

9. The apparatus of claim 1, wherein the processor is further configured to initiate manufacturing of the part.

10. The apparatus of claim 1, wherein the processor is further configured to receive an indication from the user that one or more parameters of the part information are fixed.

11. A method for dimensioning and modifying a part to be manufactured, the method comprising:
receiving, by a processor, part information for the part to be manufactured, wherein the part information for the part to be manufactured includes a representative part model of the part to be manufactured and a print of the part to be manufactured;
extracting, by the processor, at least one tolerance datum from the print;
determining, by the processor, at least one manufacturability datum as a function of the at least one tolerance datum and the representative part model of the part to be manufactured;
dynamically correlating, by the processor, a first user-submitted design parameter with a previously existing improvement to a second design parameter;
creating, by the processor, at least one updated tolerance datum as a function of the at least one manufacturability datum by training an unsupervised machine-learning model configured to identify changes to tolerance datum that improve manufacturability using training data, wherein the training data comprises a data set correlating tolerance data and past corrections related to a part previously created by the processor to manufacturability;
constructing, by the processor, an updated representative part model of the part to be manufactured as a function of the at least one updated tolerance datum;
generating, by the processor, a manufacturing quote based on the at least one updated tolerance datum and the updated representative part model of the part to be manufactured; and
transmitting, by the processor, the manufacturing quote to a user interface.

12. The method of claim 11, further comprising transmitting, by the processor, an indication of one or more updates made by the processor.

13. The method of claim 11, wherein the manufacturing quote includes one or more of the at least one updated tolerance datum, the updated representative part model of the part to be manufactured, and the manufacturability datum.

14. The method of claim 11, further comprising:
creating, by the processor, an updated print of the part to be manufactured and transmitting the updated print to the user interface.

15. The method of claim 14, wherein the updated print of the part to be manufactured incorporates the at least one updated tolerance datum.

16. The method of claim 11, further comprising transmitting, by the processor, a recommended parameter modification to the user interface.

17. The method of claim 16, wherein the recommended parameter modification is generated using a machine learning model trained using data including at least the previously existing improvement to the second design parameter.

18. The method of claim 17, wherein the recommended parameter modification includes one or more rationales.

19. The method of claim 11, further comprising initiating, by the processor, manufacturing of the part.

20. The method of claim 11, further comprising receiving, by the processor, an indication from the user that one or more parameters of the part information are fixed.

\* \* \* \* \*